US007107606B2

(12) United States Patent
Lee

(10) Patent No.: US 7,107,606 B2
(45) Date of Patent: Sep. 12, 2006

(54) SYSTEM AND METHOD FOR HIGHLY SCALABLE VIDEO ON DEMAND

(75) Inventor: Jack Yiu-bun Lee, Shatin (HK)

(73) Assignee: The Chinese University of Hong Kong, Hong Kong (CN)

( * ) Notice: Subject to any disclaimer, the term of this patent is extended or adjusted under 35 U.S.C. 154(b) by 1018 days.

(21) Appl. No.: 09/944,058

(22) Filed: Aug. 30, 2001

(65) Prior Publication Data

US 2003/0037331 A1 Feb. 20, 2003

Related U.S. Application Data

(60) Provisional application No. 60/228,756, filed on Aug. 30, 2000.

(51) Int. Cl.
*H04N 7/173* (2006.01)
(52) U.S. Cl. .............................. 725/87; 725/90; 725/94; 725/95; 725/96; 725/97; 725/101
(58) Field of Classification Search ................... 725/87, 725/90, 94, 95, 96, 97, 101
See application file for complete search history.

(56) References Cited

U.S. PATENT DOCUMENTS

| | | | | |
|---|---|---|---|---|
| 5,512,934 A | * | 4/1996 | Kochanski | 725/97 |
| 5,561,456 A | * | 10/1996 | Yu | 725/97 |
| 5,724,646 A | * | 3/1998 | Ganek et al. | 725/89 |
| 5,771,435 A | * | 6/1998 | Brown | 725/87 |
| 6,144,400 A | * | 11/2000 | Ebisawa | 725/101 |
| 6,701,528 B1 | * | 3/2004 | Arsenault et al. | 725/89 |

* cited by examiner

*Primary Examiner*—Chris Kelley
*Assistant Examiner*—Joseph G. Ustaris
(74) *Attorney, Agent, or Firm*—Fish & Richardson P.C.

(57) ABSTRACT

An embodiment of a system and method for providing video on demand provides pre-scheduled multicasts of videos as well as dynamically initiated transmissions of the front portion of videos. Users may first receive a dynamically initiated front portion of a video and then be merged into a pre-scheduled multicast. Preferably, the dynamically initiated transmission is also a multicast. Preferably, multiple admission controllers and a single server coordinate the dynamically initiated transmissions for any one video. Preferably, interactive controls are supported without requiring extra server-side resources. Preferably, latency is automatically equalized between users admitted via the pre-scheduled and the dynamically initiated transmissions. Preferably, a user receiving a video via a pre-scheduled multicast does not need to change channels to finish receiving the video transmitted. Preferably, a module can model and quickly estimate expected latency given system parameters such as number and allocation of channels and expected user arrival time(s).

48 Claims, 12 Drawing Sheets ions of the present invention,
SYSTEM AND METHOD FOR HIGHLY SCALABLE VIDEO ON DEMAND

CROSS REFERENCE TO RELATED APPLICATIONS

The present patent application is related to and claims the benefit of priority from commonly-owned U.S. Provisional Patent Application No. 60/228,756, filed on Aug. 30, 2000, entitled "Method for Improving Efficiency of Video-on-Demand Systems", which is hereby incorporated by reference in its entirety for all purposes.

BACKGROUND OF INVENTION

The present invention relates to networking, especially the providing of content to multiple users, especially video content on demand to multiple users.

Video-on-demand (VoD) systems have been commercially available for many years. However, except in a few cities, large-scale deployment of VoD service is still uncommon. One of the reasons is the high cost of establishing large-scale interactive VoD service using conventional technologies. The traditional "true VoD" (TVoD) model calls for a dedicated channel, both at the server and at the network, for each active user during the entire duration of the user's video session (for example, about one, two, or more hours for each movie). In a city with potentially more than millions or tens of millions of subscribers, the infrastructure investment required for TVoD is prohibitive.

Alternatives have been proposed to TVoD. One such alternative is called "near VoD" (NVoD). An NVoD system repeatedly broadcasts for multiple users ("multicasts") each video (e.g., movie) over multiple channels at fixed time intervals so that an incoming user can simply join the next upcoming multicast cycle without incurring additional resource expenditures by a video server. The drawback of NVoD is that, unless prohibitively many channels are dedicated to each video, the wait time (latency) faced by an arriving user can be undesirably long.

Other alternatives have been proposed to TVoD that attempt to improve upon NVoD in various ways. However, these other alternatives frequently remedy one deficiency only to create other deficiencies. For example, an approach called "chaining" allows an arriving user to view a video, not by waiting for a next pre-scheduled multicast cycle, but by quickly obtaining from a fellow user the streamed video of a previous broadcast that was recently watched and cached by the fellow user. The chaining approach can reduce latency, as compared to NVoD. However, the chaining approach also adds a new need for sufficient network bandwidth for users to stream video to one another.

Various schemes for VoD are similar to chaining in that they create complexity and resource requirements that may be tolerable for small-scale systems but that become intolerable if a large-scale system is to be built. Such schemes are merely isolated solutions to isolated problems but do not include a complete solution for a large-scale VoD system. In short, many existing schemes for VoD do not "scale up" well and are not efficient, especially if attempted to be used in large-scale VoD systems.

SUMMARY OF INVENTION

What is needed is a system and a method for VoD that are suitable for use on a large scale.

According to some embodiments of the present invention, a VoD system and method provide pre-scheduled multicasts of videos as well as dynamically initiated transmissions of the front portion of videos. Users may first receive a dynamically initiated front portion of a video and then be merged into a pre-scheduled multicast.

According to one embodiment, the dynamically initiated transmission is also a multicast.

According to another embodiment, multiple admission controllers and a single server coordinate the dynamically initiated transmissions for any one video.

According to another embodiment, interactive controls are supported without requiring extra server-side resources.

According to another embodiment, latency is automatically equalized between users admitted via the pre-scheduled and the dynamically initiated transmissions.

According to another embodiment, a user receiving a video via a pre-scheduled multicast does not need to change channels to finish receiving the video transmitted.

According to another embodiment, a module can model and quickly estimate expected latency given system parameters such as number and allocation of channels and expected user arrival time(s).

DETAILED DESCRIPTION

The description above and below and the drawings of the present document focus on one or more currently preferred embodiment(s) of the present invention and also describe some exemplary optional features and/or alternative embodiments. The description and drawings are for the purpose of illustration and not limitation. Section titles below are terse and are for convenience only.

I. An Embodiment(s) of a VoD System

Figure 1:
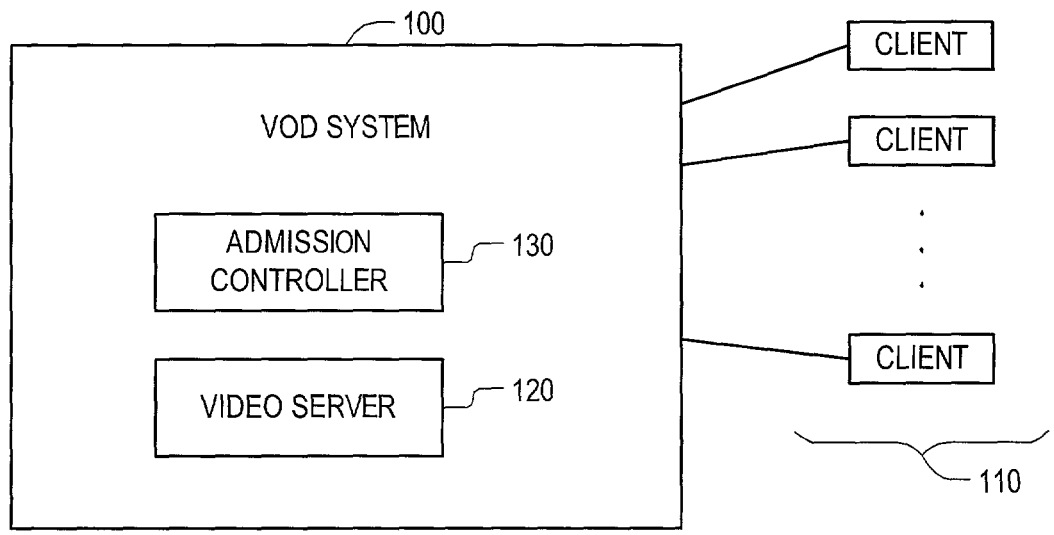
FIG. 1 is a schematic block diagram that depicts a VoD system, according to an embodiment of the present invention, and (or including) client devices.

FIG. 1 is a schematic block diagram that depicts a VoD system 100, according to an embodiment of the present invention, and (or including) client devices 110 of the VoD system 100. The VoD system 100 includes at least one video server 120 and at least one admission controller 130. Element(s) of the VoD system 100 communicate with the client devices 110, and with one another, via communication network(s), which are not separately shown. Some or all of the communication network(s) is preferably considered to be a part of the VoD system 100. The client devices 110 may also be considered to be a part of the VoD system 100.

The video server 120 is a subsystem that retrieves and transmits videos (e.g., movies) from any competent form of storage. The videos are then capable of being conveyed, e.g., by other parts of the VoD system 100, to those of client devices 110 that wish to receive the videos. The video server 120 may be built using any competent conventional technology for servers or video servers, but is controlled according to the methodology of an embodiment of the present invention. For example, the video server may include a computer processor that can retrieve information from any competent form of storage, e.g., storage based on optical, magnetic, electrical, electromagnetic, or mechanical principles, or the like, or any combination thereof, using any type of media or form factor, e.g., tape, disk, solid-state cells, molecular material, three-dimensional solid, or the like, or any combination thereof. High-performance hard disks are currently preferred.

The admission controller 130 includes logic for interfacing with individual client devices 110 to facilitate fulfilling VoD requests of the client devices 110. The admission controller 130 may be located anywhere in the VoD system 100, even on a same computer as the video server. However, the VoD system 100 is preferably a large-scale system, and the admission controller 130 is preferably on a separate computer from the video server 120.

The client devices 110 are devices that request videos from the VoD system 100. The terms "client" and "user" may be used interchangeably in the present document to mean client device, or a human operator or user of the client device, or the combination of the client device and its human operator. When context demands, however, the term "user" might occasionally be used to specifically indicate a human user or operator. The client devices 110 preferably include, or have use of, a memory, a processor, a user interface, and control logic according to an embodiment of the present invention. The client devices 110 may be incorporated within video reception systems within television systems, video recording systems, set-top boxes, personal computers, or the like, or any combination thereof. Video reception systems receive video according to any competent communication technology or technologies. These technologies may be digital or analog, electrical or electromagnetic (e.g., using any portion of the spectrum), conducted (e.g., via wires, fiber, or the like) or wirelessly transmitted, terrestrially transmitted or otherwise transmitted (e.g., by satellite, balloon, airplane, or the like), stationary or mobile, cellular or non-cellular, packet-switched or otherwise switched (e.g., circuit-switched), Internet-based or non-Internet-based, or the like, or any combination thereof using any competent network protocol(s) whatsoever. Cable TV or satellite TV or other broadband technologies are especially preferred. Video recording systems include systems that record videos using any competent technology, such as those mentioned above in connection with the video server 120.

The communication network or networks that couples components of the VoD system with one another and with the client devices 110 may use any competent networking technology or technologies. These technologies may be digital or analog, electrical or electromagnetic (e.g., using any portion of the spectrum), conducted (e.g., via wires, fiber, or the like) or wirelessly transmitted, terrestrially transmitted or otherwise transmitted (e.g., by satellite, balloon, airplane, or the like), stationary or mobile, cellular or non-cellular, packet-switched or otherwise switched (e.g., circuit-switched), Internet-based or non-Internet-based, or the like, or any combination thereof using any competent network protocol(s) whatsoever. Different parts of the communication network may use different technologies and may have different capabilities and capacities. Given the present description of the VoD system 100, a competent communication network can be established for it using conventional networking technologies without undue experimentation. For communicating with the client devices 110, cable TV or satellite TV or other broadband networks are especially preferred.

As will be further discussed, the VoD system according to some embodiments of the present system utilizes a number of channels for pre-scheduled transmissions ("static channels"), as well as a number of channels for more dynamically initiated and later-scheduled transmissions ("dynamic channels"). An incoming user who wishes to receive a video will be admitted to receive the video according to admission logic of an embodiment of the present invention. Under the admission logic of the embodiment, the user will be admitted either as a statically admitted user or as a dynamically admitted user. The terms static and dynamic, as used in the present document to classify channels and user admissions, are merely convenient labels to distinguish earlier-scheduled (also called pre-scheduled) transmissions and their channels from later-scheduled transmissions and their channels and are not intended to necessarily imply or require other, more detailed distinctions or limitations.

II. An Embodiment(s) of VoD Methodology

Figure 2:
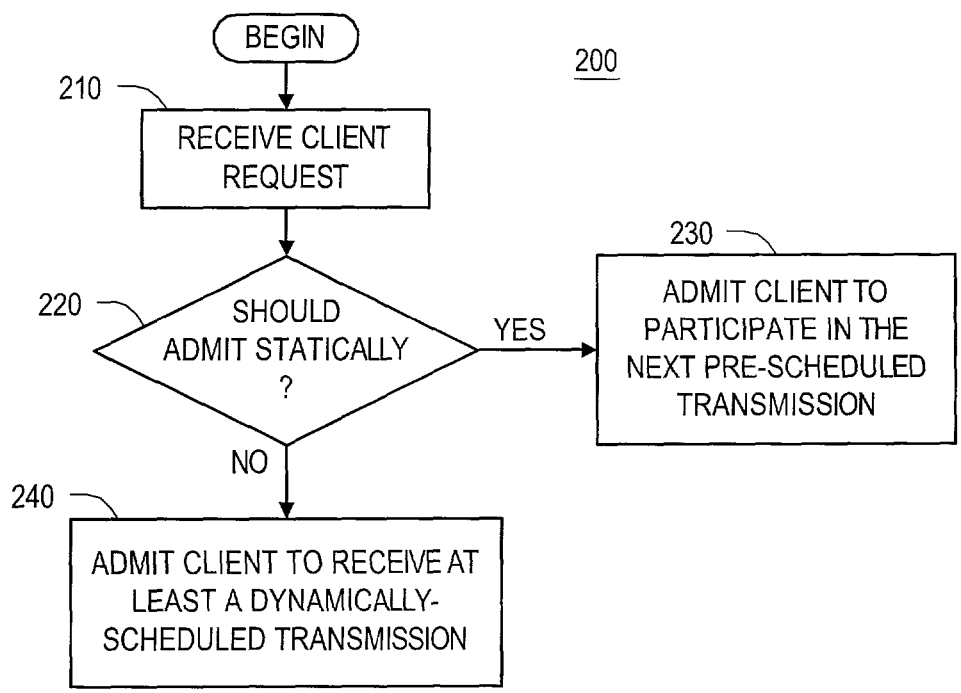
FIG. 2 is a schematic flow diagram that depicts a method of admitting new users to receive a video.

FIG. 2 is a schematic flow diagram that depicts a method 200 of admitting new users to receive a video. The method 200 may be implemented, for example, by the VoD system 100 of FIG. 1, especially with involvement of its admission controller 130. As shown in FIG. 2, the method 200 includes a step 210 of receiving a particular client's request to receive a particular video. In a step 220, it is determined whether the particular client should be admitted statically or dynamically. Dynamic or static admission have been discussed above, and will be further discussed below. If the particular client is to be admitted statically, then, in a step 230, the particular client is admitted to receive the particular video through a pre-scheduled transmission. If the particular client is to be admitted dynamically, then, in a step 240, the client is admitted to receive the video, at least initially, through a dynamically initiated transmission, preferably a multicast. As will be further discussed, the dynamically admitted client will preferably be merged, or patched, into a pre-scheduled transmission after a certain point.

Figure 3:
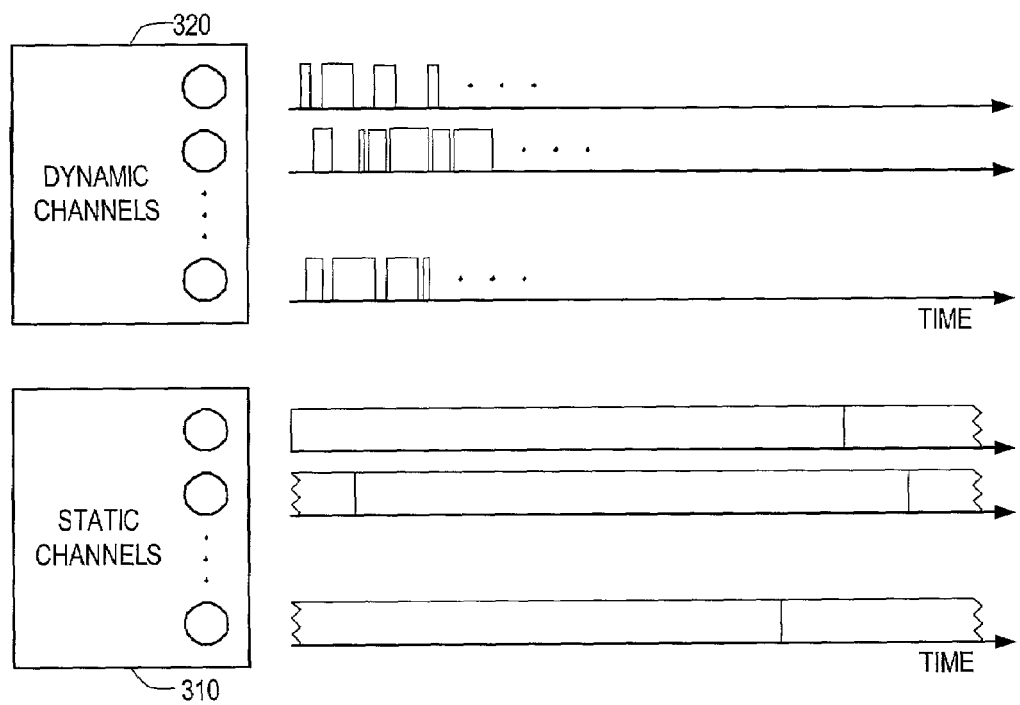
FIG. 3 is a schematic diagram that illustrates one possible sequence of transmissions on static channels and dynamic channels of a VoD system according to an embodiment of the present invention.

FIG. 3 is a schematic diagram that illustrates one possible sequence of transmissions on static channels 310 and dynamic channels 320 of a VoD system according to an embodiment of the present invention. For example, a given video is transmitted, e.g., broadcast or, more preferably, multicast, repeatedly across multiple static channels 310 in a time-staggered manner. Preferably, the video is multicast substantially in its entirety on each such static channel 310, and the receiver (e.g., client), once receiving the multicast video, does not have to switch channels to finish receiving substantially the entire remainder of the video. In contrast, preferably, merely portions of individual videos are transmitted over the dynamic channels. The portions are of differing lengths, even for a same video, and are transmitted at substantially unpredictable times, according to methodology of an embodiment of the present invention, as discussed above and as will be further discussed below.

According to a preferred embodiment of the present invention, the admission logic is as follows. The statically admitted user simply receives the entire video by awaiting and then joining a next pre-scheduled multicast, preferably via a single static channel without having to change to another channel during the course of receiving substantially the entire video. The admission controller of a VoD system preferably uses a simple time threshold to determine whether to admit a user statically. If the user requests to begin viewing a video (e.g., "arrives") within a threshold period before the start of the next pre-scheduled transmission of the video, then the user is admitted statically. The threshold period can be referred to as 2δ (two times δ).

Figure 4A:
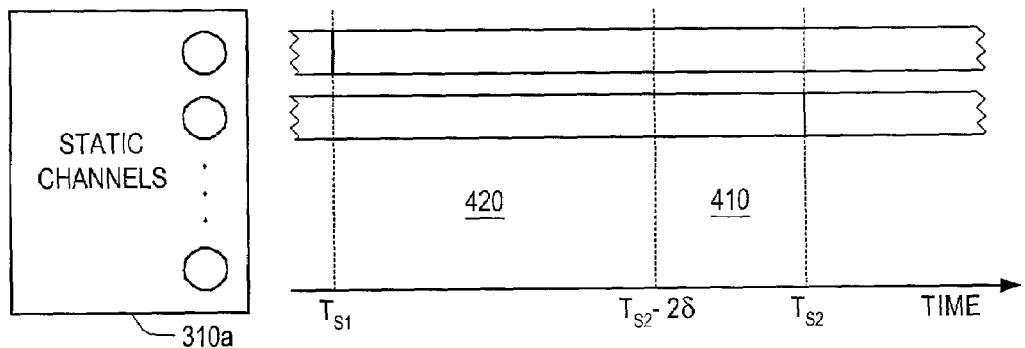
FIG. 4A is a schematic timing chart that illustrates admission and transmission for a statically admitted user.

FIG. 4A is a schematic timing chart that illustrates admission and transmission for a statically admitted user. FIG. 4A shows a period of time between the start (time $T_{S1}$) of one pre-scheduled multicast and the start (time $T_{S2}$) of the next pre-scheduled multicast. A time region 410 is within the time threshold (2δ) before the start of the next pre-scheduled multicast. A user that arrives within the time region 410 will be admitted statically. A time region 420 is not within the time threshold (2δ) before the start of the next pre-scheduled multicast. A user that arrives within the time region 420 will be admitted dynamically, as is further discussed starting in the following paragraph. The statically admitted user preferably receives the entire video from the next pre-scheduled multicast, preferably on a single multicast channel and without having to change channels, e.g., without requiring further communication, for channel establishment, between the user (e.g., client) and any router of the network that couples the client to the VoD system.

The dynamically admitted user receives at least a part, e.g., the front part, of the video through a dynamically initiated transmission. Preferably, the dynamically admitted user is eventually merged into one of the pre-scheduled multicasts to receive the remainder part of the video via that pre-scheduled multicast, preferably in the following-discussed manner.

Figure 4B:
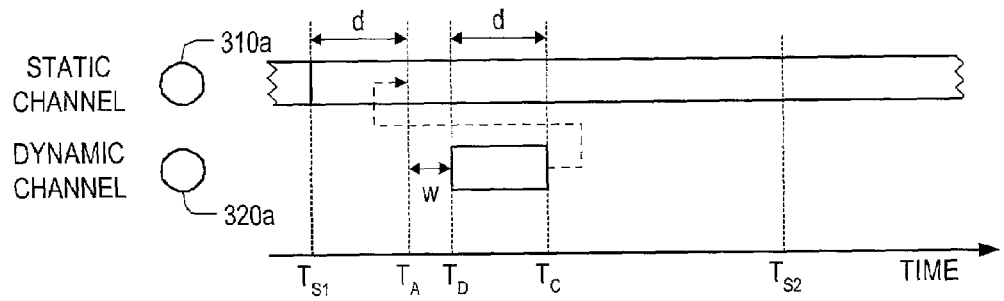
FIG. 4B is a schematic timing chart that illustrates admission and preferred transmission for a dynamically admitted user.

FIG. 4B is a schematic timing chart that illustrates admission and preferred transmission for a dynamically admitted user. Times $T_{S1}$ and $T_{S2}$ in FIG. 4B are as described in connection with FIG. 4A. Upon arriving (at time $T_A$), the user who will be dynamically admitted begins receiving and caching the most recently-started multicast of the video via that multicast's static multicast channel. However, the dynamically admitted user has already missed the beginning of the video. The missed amount is of a duration d, which equals $T_A$ minus $T_{S1}$.

A dynamically initiated transmission is started (at time $T_D$), for reception by the dynamically admitted user. The dynamically admitted user begins viewing the dynamically initiated transmission until that transmission reaches the point in the video (i.e., to duration d) at which caching had started from the pre-scheduled multicast. At that point (time $T_C$), the dynamically admitted user leaves the dynamically initiated transmission and begins viewing the remainder of the video from the cache. Thus, the dynamically admitted user has been patched into, or merged into, the multicast. The multicast, of course, is time-shifted (i.e., time-delayed) for the user, preferably as described via the user's local cache without incurring additional resource expenditures by the network or the remainder of the VoD system. The local cache is preferably implemented conventionally as a circular buffer so that the oldest already-seen portions of the cache can be reused to reduce the buffer space needed.

In one embodiment of the present invention, every transmission over the dynamic channels must be a unicast (i.e., for reception by only one user). In such an embodiment, the time $T_C$ is the time at which the dynamic transmission may be completed, so that the dynamic channel can be freed for other use, e.g., to service other users.

Preferably, however, each dynamically initiated transmission is itself a multicast that is shared by all dynamically admitted users for the video, who arrived and were admitted in time to catch the beginning of the dynamically initiated multicast. (In a large-scale VoD system, it would be common for multiple users to request, very close in time, a same video.) When the dynamically initiated transmission (e.g., multicast) has transmitted enough of the beginning of the video such that all recipient users have left the dynamically initiated transmission and are viewing video from their own caches, then the dynamically initiated transmission can stop and its dynamic channel made available for subsequent use, e.g., to service other users.

Figure 4C:
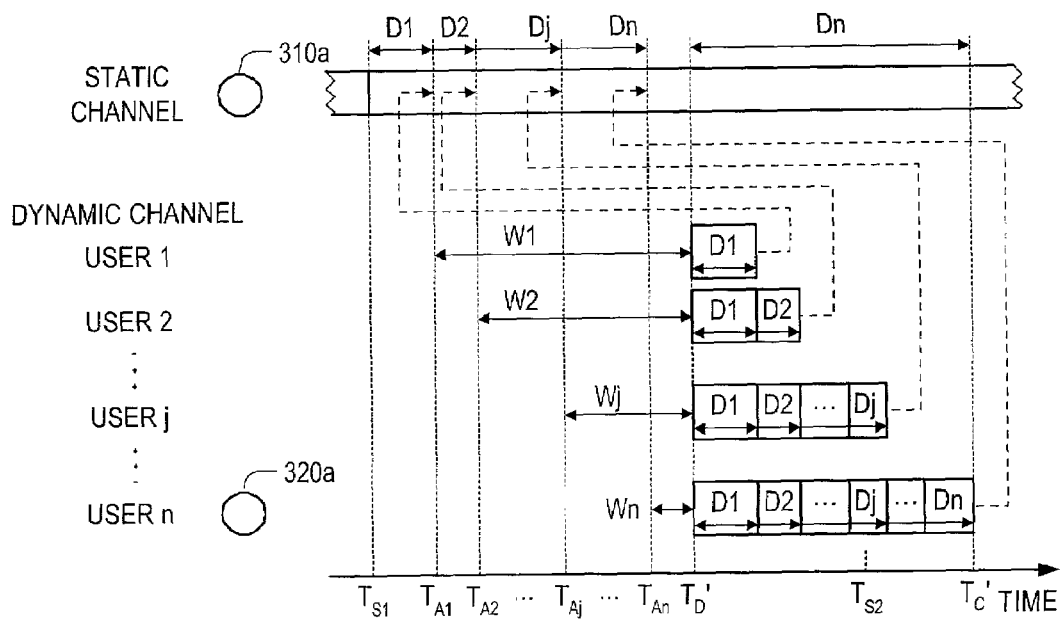
FIG. 4C is a schematic timing chart that illustrates admission and preferred transmission for n dynamically admitted users who form a dynamic admission group for a video and share a dynamically initiated multicast that is merged into a statically scheduled multicast.

FIG. 4C is a schematic timing chart that illustrates admission and preferred transmission for n dynamically admitted users who form a dynamic admission group for a video and share a dynamically initiated multicast that is merged into a statically scheduled multicast. Times $T_{S1}$ and $T_{S2}$ in FIG. 4C are as described in connection with FIG. 4A. The n users arrive at times $T_{A1}$, $T_{A2}$, . . . $T_{An}$, respectively. Upon their arrival, the n users have already missed the front D1, D2, . . . Dn duration of the video, respectively, and start caching the most recent static transmission of the video. The n users receive the front D1, D2, . . . Dn duration of the dynamically initiated multicast, respectively, after which they can be merged into their respectively cached streams of the statically scheduled transmission (multicast). As discussed above, when the longest duration (Dn) needed by any client in the dynamic admission group has been broadcast in the dynamically-scheduled multicast, then the dynamically initiated transmission can stop and its dynamic channel made available for subsequent use, e.g., to service other users.

III. An Embodiment(s) of a VoD System and Methodology

Figure 5:
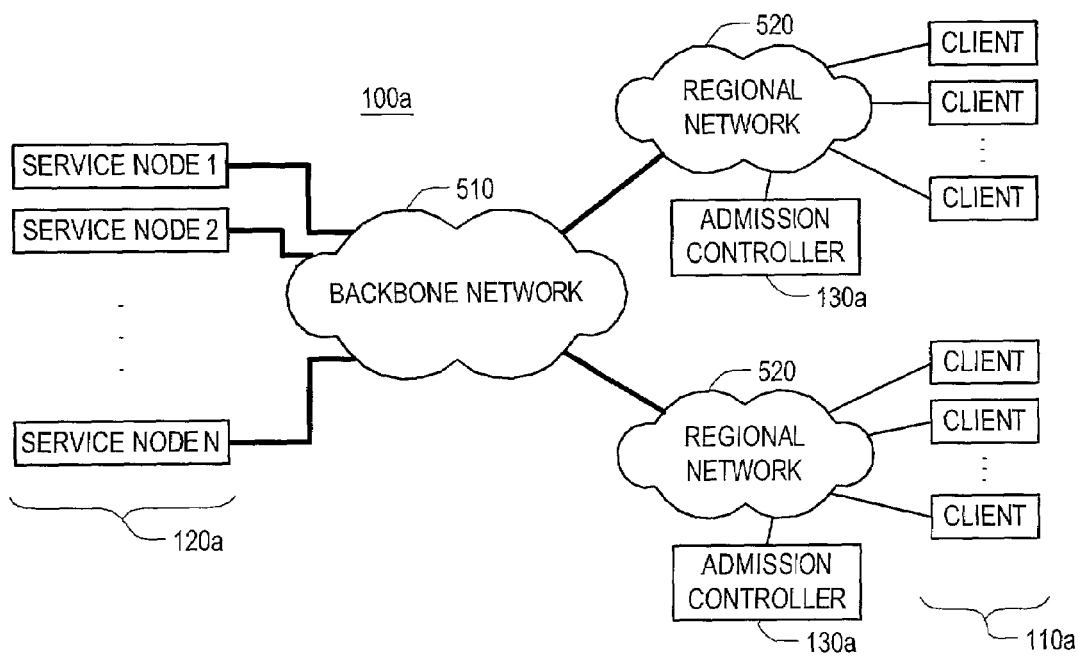
FIG. 5 is a schematic block diagram that depicts a VoD system, according to a preferred embodiment of the present invention.

FIG. 5 is a schematic block diagram that depicts a VoD system 100a, according to a preferred embodiment of the present invention. The VoD system 100a may be considered to be a particular embodiment of the VoD system 100 of FIG. 1. The VoD system 100a is especially scalable and suitable for very large-scale deployment, for example, to serve at least one million, at least ten million, or at least twenty million video subscribers. The VoD system 100a is preferably built by modifying a conventional video network, for example, a cable TV network, by adding the features being described. Since video networks are already a well-known conventional technology, FIG. 5 and the present document does not need to describe every element of a video network. Instead, FIG. 5 and the present document concentrate on the components of a VoD system that are especially relevant to the discussed embodiments of the present invention.

As depicted in FIG. 5, the VoD system 100a comprises a number of service nodes 120a connected via a multicast-ready network to clients 110a. The multicast-ready network preferably includes a backbone network 510 and regional networks 520. The clients 110a form clusters according to their geographical proximity. An admission controller 130a in each cluster performs authentication and schedules requests for forwarding to the service nodes 120a.

Each service node 120a preferably operates substantially independently from the other service nodes 120a and preferably has, or has access to, its own storage (e.g., disk storage), memory, CPU, and network interface. Hence a service node 120a is effectively a video server, albeit serving a small number of video titles to the entire user population. This modular architecture can simplify the deployment and management of the system. For example, the configuration of each service node is decoupled from the scale of the system and each service node carries just a few movies, and a service provider simply deploys the right number of service nodes 120a according to the desired video selections. Additional service nodes 120a can be added when more movie selections are needed, with the existing nodes remaining unchanged.

The VoD system 100a preferably implements, in an especially scalable manner, the methodology discussed above in connection with FIGS. 4A and 4C. For example, the VoD system 100a admits clients either statically or dynamically. The VoD system 100a preferably has a plurality of multicast channels. At any time, some of these channels are dedicated for pre-scheduled transmissions (static channels) and others are dedicated for dynamically scheduled, also called dynamically initiated, transmissions (dynamic channels).

Figure 6:
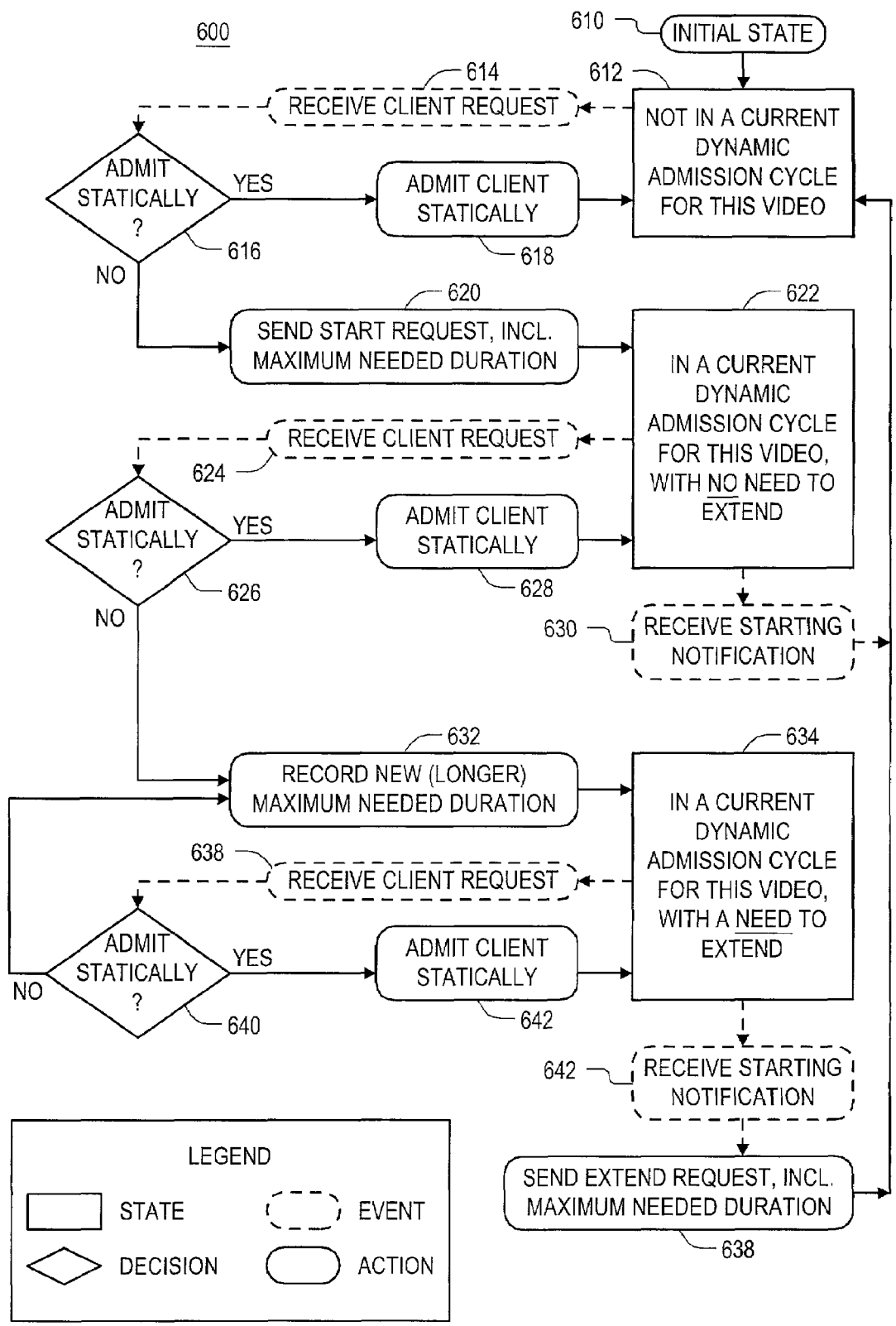
FIG. 6 is a schematic state diagram that describes the preferred methodology and protocol used by each admission controller (of FIG. 5) to accept arriving clients.

FIG. 6 is a schematic state diagram 600 that describes the preferred methodology and protocol used by each admission controller (AC) 130a (of FIG. 5) to accept arriving clients. The state diagram 600 represents state with respect to one particular video (i.e., one video title) that is available on demand. Thus, for every available video at each AC 130a, there is one maintained instance of the states and values represented by the state diagram 600. As will be seen, the states of the state diagram 600 relate to the phases of a dynamic admission session during which one transmission for the particular video is dynamically scheduled. As will also be seen, the main maintained value associated with the state diagram 600 is a maximum needed duration, which will be defined below. The dynamic admission session, which may also be referred to as a dynamic admission cycle, is conducted by interaction between, first, all admission controllers (ACs) 130a having clients that are requesting the video during the dynamic admission cycle and, second, a service node 120a (of FIG. 5) that is responsible for serving the video. The dynamic transmission is to be shared, if possible, by multiple such clients, preferably as a multicast, as discussed above in connection with FIG. 4C.

The state diagram 600 represents the state, values, and actions of a particular AC 130a (the AC 130a) in connection with a particular video (the video), e.g., a particular movie. As indicated by a label 610, there is an initial state 612. The initial state 612 represents the situation that the AC 130a is not yet participating in any current dynamic admission cycle for the video. Upon receiving (614) from a client a request to begin viewing the video (i.e., upon a client's arrival), the AC 130a decides (616) whether to statically admit the client. The AC 130a, and indeed all ACs 130a, knows the complete transmission schedule for all pre-scheduled multicast channels for all available videos. Using such knowledge of the start times of all pre-scheduled multicast transmissions for the video, the decision (616) is preferably based on a simple admission threshold, as discussed above in connection with FIG. 4A.

If the client is to be statically admitted, then the client is statically admitted (618) without incurring any additional load to any back-end service node 120a, and the AC 130a remains in the initial state 612.

Alternatively, in the initial state, when a client arrives (614) for the video and is decided (616) to be dynamically admitted, and not statically admitted, then the AC 130a will send (620) a START request to a higher level of the system, for example, to the particular service node 120a (of FIG. 5) that is responsible for serving the particular video (the SN 120a). For efficiency, the sending (620) from the AC 130a will occur just once in connection with the current dynamic admission cycle, which means that for one dynamic admission cycle, just one START request is sent by each AC 130a that participates in the one dynamic admission cycle.

As mentioned above in connection with FIGS. 4B and 4C, the client to be dynamically admitted has already begun to cache video from the most recently started static multicast of the video, under direction from the AC 130a. The AC 130a knows the duration (or at least an upper bound of it) that the client to be dynamically admitted has missed (e.g., duration D1 of FIG. 4C). This duration is the minimum amount, from the client's point of view, of the front of the video that the dynamically scheduled transmission (multicast) should include. The START request that is sent (620) includes an identifier (e.g., the title or a numeric code) for the video and the value of the needed duration (e.g., duration D1 of FIG. 4C). With the single sending (620) of the START request, the AC 130a begins to participate in, and may have initiated, a current dynamic admission cycle for the video. The AC 130a records locally the value of the needed duration (e.g., duration D1 of FIG. 4C) as the maximum needed duration, mentioned above. The maximum needed duration, of the AC 130a for the video, is the greatest duration of the front portion of the video that is needed by any client of the AC 130a that is participating in the present dynamic admission cycle. After sending (620) the START request (and preferably receiving confirmation of its receipt), the AC 130a enters a second state 622.

The second state 622 represents the situation that the AC 130a has started participating in a current dynamic admission cycle for the particular video, and so far has already told the START request's recipient the currently correct value of the AC 130a's maximum needed duration (e.g., duration D1 of FIG. 4C). In the second state 622, the AC 130a may either receive (630) a STARTING notification from the SN 120a or receive (624) a request from another client to begin viewing the video. A STARTING notification from the SN 120a is an indication that a dynamically scheduled transmission has just been scheduled for the video. The scheduled transmission will be of sufficient duration to handle all START requests received by the SN 120*a* from any of the ACs 130*a*, during the current dynamic admission cycle.

If the AC 130*a* first receives (630) the STARTING notification, while in the second state 622, then the current dynamic admission cycle is over, and no more clients of the AC 130*a* would be allowed to join the dynamic admission group that was just formed, and the AC 130*a* returns to the initial state 612.

Alternatively, if the AC 130*a* first receives (624) a request from another client to begin viewing the video, while in the second state 622, then AC 130*a* decides (626) whether to statically admit this client, perhaps again based on the simple admission threshold discussed above. (As an alternative to using the admission threshold, the AC 130*a* may instead be programmed to always choose dynamic admission when in the second state 622.) If the client is to be statically admitted, then the client is statically admitted (628) without incurring any additional load to any back-end service node 120*a*, and the AC 130*a* remains in the second state 622. Alternatively, if the client is to be dynamically admitted, then the AC 130*a* updates (632) its local record, as necessary, of the AC 130*a*'s maximum needed duration. Generally, the AC 130*a*'s maximum needed duration will need to be locally updated (632) to equal the needed duration of the client (e.g., duration D2 of FIG. 4C). If the maximum needed duration is locally updated (632), then the AC 130*a* enters a third state 634.

The third state 634 represents the situation that the AC 130*a* is participating in a current dynamic admission cycle for the particular video, but has a locally recorded maximum needed duration that is now greater than the maximum needed duration that was earlier sent (620) within the START request. The purpose of the third state 634 is to allow the AC 130*a* to accept any more arriving clients into the currently forming dynamic admission group and to keep updating the local record of the AC 130*a*'s maximum needed duration without bombarding the SN 120*a* with a message for every such arriving client. In this way, the AC 130*a* shields the SN 120*a* from being overwhelmed by the potentially tremendous number of clients that are served.

In the third state 634, the AC 130*a* expects to receive (636) a STARTING notification from the SN 120*a*, preceded by receiving (638) any number of requests from other clients to begin viewing the video. A STARTING notification from the SN 120*a* has already been explained above.

For each client request received (638) while in the third state 634, the AC 130*a* decides 640 whether to statically admit that client, perhaps again based on the simple admission threshold discussed above. (As an alternative to using the admission threshold, the AC 130*a* may instead be programmed to always choose dynamic admission when in the third state 634.) If the client is to be statically admitted, then the client is statically admitted (642) without incurring any additional load to any back-end service node 120*a*, and the AC 130*a* remains in the third state 634. Alternatively, if the client is to be dynamically admitted, then the AC 130*a* updates (632) its local record, as necessary, of the AC 130*a*'s maximum needed duration, and remains in the third state 634. Generally, the AC 130*a*'s maximum needed duration will need to be locally updated (632) (e.g., to duration Dj of FIG. 4C).

When the AC 130*a* receives (636) the STARTING notification, while in the third state 634, then no more clients of the AC 130*a* will be allowed to join the dynamic admission group that is being formed. The AC 130*a* sends (638) just a single EXTEND request, which includes the AC 130*a*'s up-to-date maximum needed duration. When the SN 120*a* receives the EXTEND request, it will then make sure to transmit at least enough of the front of the video to satisfy even the greatest maximum needed duration from any of the ACs 130*a* (the overall maximum needed duration). With the sending (638) of the EXTEND request (and confirmation of its receipt), the current dynamic admission cycle is over, and the AC 130*a* returns to the initial state 612.

In an optional embodiment of the VoD system 100*a* (of FIG. 5), the STARTING notification from the SN 120*a* includes the SN 120*a*'s initial version of the overall maximum needed duration. The overall maximum needed duration is determined by the SN 120*a* by taking the greatest of the maximum needed durations from all of the START requests received from any ACs 130*a* during this dynamic admission cycle. In the optional embodiment, the AC 130*a* sends the EXTEND request only if the AC 130*a*'s local record of the AC 130*a*'s maximum needed duration is actually greater than the initial version of the overall maximum needed duration. In this way, the total number of EXTEND requests that are sent to the SN 120*a* may be at least somewhat reduced.

The SN 120*a*, as mentioned above, provides both the pre-scheduled multicasts for statically admitted users and also dynamically schedules multicasts for dynamically admitted users. Operation of the pre-scheduled multicasts for statically admitted clients has already been discussed, and in fact is preferably implemented conventionally, in the manner of a conventional NVoD system. Therefore, operation of the SN 120*a* in connection with pre-scheduled multicasts for statically admitted clients needs not be further discussed here. Instead, operation of the SN 120*a* in connection with a dynamic admission session will now be discussed.

Figure 7:
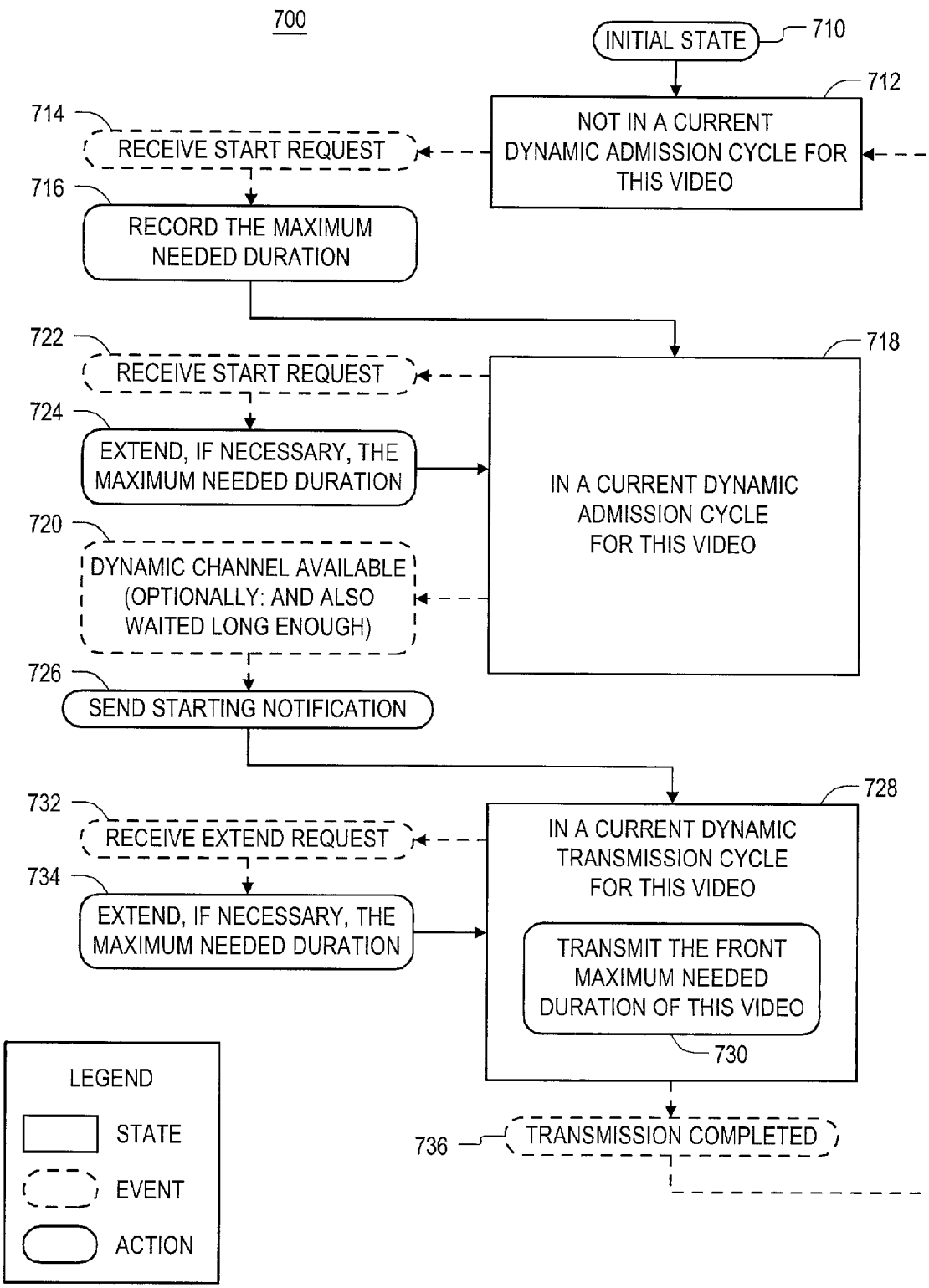
FIG. 7 is a schematic state diagram that describes the preferred methodology and protocol used by a service node in connection with a single dynamic admission cycle for a particular video served by the service node.

FIG. 7 is a schematic state diagram 700 that describes the preferred methodology and protocol used by the SN 120*a* in connection with a single dynamic admission cycle for a particular video. The state diagram 700 represents state with respect to one particular video (i.e., one video title) that is available on demand. Thus, for every available video served by SN 120*a*, SN 120*a* maintains one instance of the states and values represented by the state diagram 700. As will also be seen, the main maintained value associated with the state diagram 700 is an overall maximum needed duration, which has been discussed above, for the dynamic admission cycle.

In the state diagram 700, as indicated by a label 710, there is an initial state 712. The initial state 712 represents the situation that the there is no current dynamic admission cycle for the particular video. A dynamic admission cycle starts upon the receiving (714) of a START request for the video from one of the ACs 130*a*. The SN 120*a* records (716), from that START request, the AC 130*a*'s maximum needed duration as the overall maximum needed duration of the transmission that is being dynamically scheduled. Then, the SN 120*a* enters a second state 718.

The second state 718 represents the situation that the there is now a current dynamic admission cycle for the video. In the second state 718, the SN 120*a* essentially waits for a channel to become (720) available for the transmission that is being dynamically initiated. Optionally, there can be an artificial minimum wait Wmin imposed in the second state 718, so as to give more time for possibly more clients to join the dynamic admission group that is being formed. For example, the wait may be at least two seconds, or at least ten seconds, and may be adjustable. During the wait in the second state 718, the SN 120*a* may receive (722) additional START requests from other ACs 130*a* for the video. As mentioned above, the SN 120*a* can receive at most one such START request from any one AC 130*a* for the video during the dynamic admission cycle. As mentioned above, each such START request includes its respective AC 130*a*'s maximum needed duration. If a START request's maximum needed duration is greater than the current overall maximum needed duration, then the greater value is recorded (724) as the new current overall maximum needed duration.

When the channel becomes (720) available, then the SN 120*a* schedules the dynamic transmission and sends (726) a STARTING notification to all ACs 130*a*. The STARTING notification gives the ACs 130*a* information on the dynamic multicast channel to be used and other information so that the ACs 130*a* can cause their dynamically admitted clients to receive the dynamic multicast. Optionally, as discussed above, the STARTING notification also includes the current overall maximum needed duration. After sending (726) the STARTING notification, the SN 120*a* enters a third state 728.

The third state 728 represents the situation that the dynamic admission cycle for the video is now closed to new clients. In the third state 728, the SN 120*a* gives itself an opportunity (e.g., enough time) to receive (732) an EXTEND request from any AC 130*a* that wishes to send an EXTEND request. From among all the EXTEND requests that are received (732), the greatest of their individual maximum needed durations is set (734) as the new, final overall maximum needed duration. In the third state 728, the SN 120*a* multicasts (730) the front portion of the video, up to at least the final overall maximum needed duration (the transmission duration). When the transmission duration of the front portion of the video has been transmitted (736), the transmission stops, and its channel is released for other use, e.g., for subsequent dynamic multicasts.

In the third state 728 the SN 120*a* may optionally have begun the dynamically initiated multicast (730) even before receiving all EXTEND requests, to further reduce latency, at least slightly. If this was done, then the SN 120*a* would be able to receive the EXTEND requests and process them while still multicasting.

In the third state 728, if the SN 120*a* receives another START request from an AC 130*a* for the video, that START request would be too late to join in the current dynamic admission cycle. Instead, the SN 120*a* would fork off another instance of the initialized states and values represented by the state diagram 700, to begin a new dynamic admission cycle, and the START request can be treated as the event 714 of the new dynamic admission cycle.

It may appear that the previous admission procedure is unnecessarily complex and the clients can better off sending requests directly to the service nodes. However, such a direct approach suffers from poor scalability. In particular, recall that each service node serves a few video titles to the entire user population. Therefore as the user population grows, the volume of requests directed at a service node will increase linearly and eventually exceed the service node's processing capability.

In contrast, each AC 130*a* generates at most two requests, one START request and one EXTEND request, for each dynamically-started multicast transmission, irrespective of the actual number of client requests arrived in an admission cycle. Given that the number of admission controllers is orders of magnitude smaller than the user population, the processing requirement at the service nodes is substantially reduced. For extremely large user populations where even requests from admission controllers can become overwhelming, one can extend this request-consolidation strategy into a hierarchical structure by introducing additional layers of admission controllers to further consolidate requests until the volume becomes manageable by the service nodes. Each higher-level admission controller would handle a cluster of lower-level admission controllers and essentially treat them as "clients". In short, the higher-level admission controller would treat START requests from its lower-level admission controllers in the same manner as the ACs 130*a* discussed above treat their clients.

Figure 8:
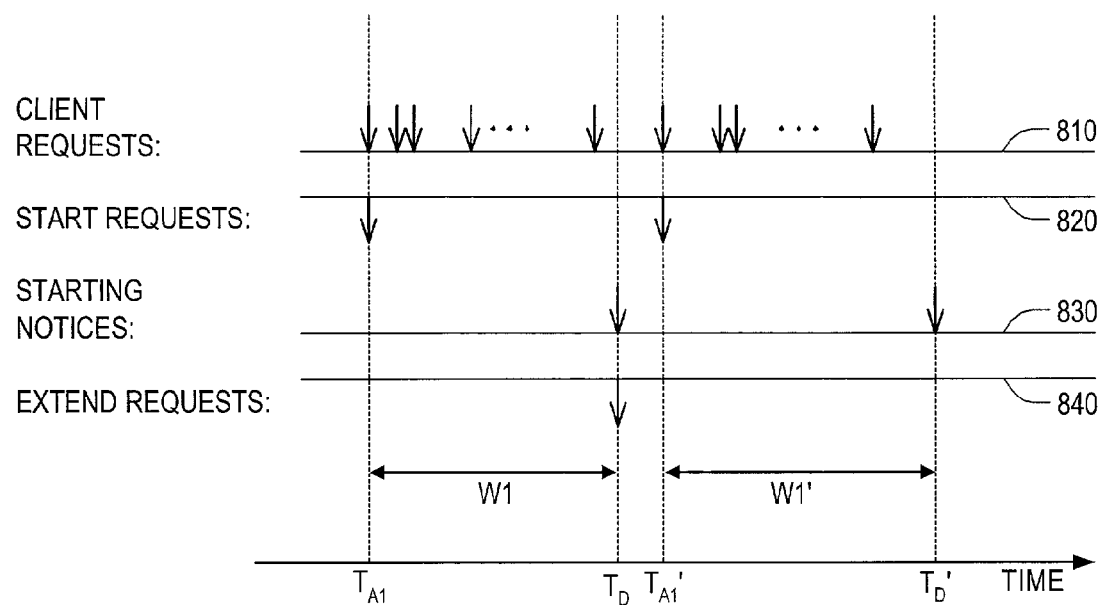
FIG. 8 is a schematic timing diagram that illustrates the reduction in the volume of messages that is enabled by the admission methodology of FIGS. 6 and 7.

FIG. 8 is a schematic timing diagram that illustrates the reduction in the volume of messages that is enabled by the admission methodology of FIGS. 6 and 7. FIG. 8 shows the messages sent and received at an AC 130*a* during two example dynamic admission cycles. As shown, in a first cycle, a large number of client requests (810), corresponding to client arrivals, might be received between the time of arrival ($T_{A1}$) of the first client and the time of the end of the dynamic admission cycle. The end of the dynamic admission cycle is roughly the beginning (time $T_D$) of the dynamically initiated multicast. As can be seen, the AC 130*a* sends at most two messages toward the SN 120*a* in the first cycle: a START request (820) at time $T_{A1}$ and an EXTEND request (840) at around time $T_D$. Similarly, the SN 120*a* sends at most one message in the first cycle: a STARTING notice (830) at around time $T_D$. The second cycle shown in FIG. 8, from a time $T_{A1}'$ to a time $T_D'$, illustrates the same point, except that no EXTEND request 840 even needed to be sent (because after the last client arrival in the AC 130*a*, another AC 130*a* must have sent a START request, thereby making the overall maximum needed duration already longer than the AC 130*a*'s maximum needed duration).

The VoD system 100*a* (of FIG. 5) and/or its methodology (for example, as discussed above in connection with FIGS. 4A, 4C, 6, 7, and 8) may, for convenience, be referred to as super-scalar (SS-VoD) below.

Preferably, embodiments of the VoD system 100*a* (of FIG. 5) are configured such that the number of requests to receive a video sent by all clients, compared with the number of requests received by an SN 120*a* for the video in connection with satisfying those client requests, can be more than about 10,000 times greater, or more than about 100,000 times greater, or more than about 1,000,000 times greater.

As mentioned or suggested above, each service node 120*a* of the VoD system 100*a* (of FIG. 5) preferably has a plurality of multicast channels. At any time, some of these channels are dedicated for pre-scheduled transmissions (static channels) and others are dedicated for dynamically initiated transmissions (dynamic channels). Preferably, each available video to be served using the methodology discussed above (in connection with FIGS. 4A, 4C, 6, 7, and 8) is pre-allocated a number of static channels. Optionally, available videos that are expected to be more popular are allocated a greater number of static channels than less popular videos. The dynamic channels may also be allocated to individual videos. For example, a video may be allocated about the same number of dynamic channels as static channels. This 50/50 split of each video's allocated channels between dynamic and static channels has been found to work well, as will be further discussed below. Optionally, some or all of the dynamic channels are not necessarily allocated to individual videos and instead are shared across all available videos.

Optionally, the VoD system 100*a* may be loosely integrated with a parallel conventional VoD system of any conventional design to form a combined VoD system. Under this option, the available videos that are expected to be more popular are served using the VoD system 100*a* and its methodology discussed above, in which each such more popular video is allocated some static channels. However, the parallel conventional VoD system handles videos that are expected to be less popular. System resources, e.g., channels, are substantially independently allocated among the two parallel systems. For example, even if the conventional VoD system becomes swamped and extremely sluggish, or "timed out" for new requests, the VoD system 100a still functions normally for the more popular movies. Below, discussion returns to the VoD system 100a and its methodologies.

Preferably, the pre-scheduled multicast transmissions have uniformly staggered start-times. For example, if a video has length L and is repeatedly broadcast across $N_S$ static channels, then the start time on each successive one of the $N_S$ static channels is offset by about $$T_R = \frac{L}{N_S} \quad \text{(eq 1)}$$

in time as compared to the start time in the preceding one of the $N_S$ static channels.

Under the preferred pre-scheduling of the multicast transmissions, a particular pre-scheduled multicast of a movie takes place and the start time of that multicast is not in response to any user arrival or arrivals that will receive that multicast. For example, even if no user is expected to watch, or no user actually watches that multicast, the multicast still takes place at the pre-scheduled time. The pre-scheduling preferably takes place substantially in advance, for example, more than about 6 hours in advance, or more than about one day in advance, or more than about one week in advance of the multicast. The schedules are conveyed to each AC 130a (of FIG. 5) so that at any tire, each AC 130a has a correct schedule of all pre-scheduled multicasts that have begun or that are next to begin for any available video whose admission and transmission are to use the above discussed methodology.

Preferably, as was mentioned in connection with FIG. 3, the video is multicast substantially in its entirety on each static channel, and the receiver (e.g., the end user), once receiving the multicast video on a static channel, does not have to switch channels to finish receiving substantially the entire remainder of the video.

There is a concept called "prefix caching" under which regional cache servers are placed close to the users to store and serve only the initial portion (prefix) of many available videos. In this way, a client can start video playback immediately by receiving prefix data streamed from a regional cache server. The server will then dynamically schedule a patching unicast for the client to continue the patching process beyond the prefix, and the patching unicast itself may be merged with a another dynamically scheduled multicast. In one embodiment of the present invention, the VoD system 100a operates without use of regional prefix cache servers. In another embodiment of the present invention, the VoD system 100a works in conjunction with regional prefix cache servers, but instead of dynamically scheduling a patching unicast, the VoD system 10a uses its methodology as discussed above (e.g., in connection with FIGS. 4C, 6, 7, and 8) to dynamically schedule a patching multicast. Preferably, the patching multicast is then merged into a pre-scheduled full multicast.

Each client 110a (of FIG. 5) has the capability to receive two multicast channels concurrently and preferably has a local buffer at least large enough to hold video of any maximum needed duration that is expected, which for the preferred system, is simply the greatest expected offset (e.g., the greatest $T_R$) between pre-scheduled transmission times. Given a video bit-rate of 3 Mbps (e.g. high-quality MPEG4 video), a total of 6 Mbps downstream bandwidth will be needed for the initial portion of the video session (e.g., for the client when the client is dynamically admitted). For a two-hour movie served using 25 static multicast channels, the buffer requirement will become 108 MB. The buffer may be implemented on a small hard disk in the client or even using semiconductor memory.

The admission threshold duration 2δ may be adjusted automatically. As the system becomes busier, i.e., as the arrival rate increases, a smaller percentage of users should be admitted dynamically, and the admission threshold duration 2δ is increased. Preferably, a separate admission threshold is maintained for each particular video at a value such that the average startup latency for statically admitted users is about equal to the average startup latency for dynamically admitted users. Methodology for so maintaining the threshold by automatic adjustment is discussed further below. Similarly, the artificial minimum wait Wmin in the dynamic allocation may be adjusted automatically so that as the system becomes busier, the minimum wait Wmin is increased.

Thus The SS-VoD architecture, using the admission threshold, can easily trade off average start-up delay for capacity in a continuous manner, to exhibit very graceful degradation of performance even under exceptionally high arrival rates. Furthermore, the system performance of the preferred embodiment is, to a large degree, guaranteed such that in the worst case, assuming there are enough admission controllers for all clients, the start-up delay is no worse than the start up delay of an NVoD system that corresponds to the static channels of the SS-VoD system. (In fact, if about a 50/50 allocation of static and dynamic channels is used for a video, then the worst-case start-up delay for that video can be expected to be substantially better than merely the delay of its static channels, as will be further discussed. In sharp contrast to conventional VoD systems where the system cost can increase at least linearly with the system scale, an SS-VoD system becomes more efficient as the system scales up and can ultimately be scaled up to serve any number of users while still keeping the startup latency short and in fact, bounded by a worst-case latency. The system cost of an SS-VoD system grows substantially less than linearly with the number of user arrivals that are to be handled.

IV. An Embodiment(s) that Supports Interactive Controls

To provide a complete VoD service, interactive playback controls such as pause-resume, slow motion, seeking, etc. are also supported in an embodiment of the VoD system 100a (of FIG. 5). Among these, pause/resume is likely the control most frequently performed in typical movie-on-demand applications. Intuitively, performing an interactive control in SS-VoD essentially breaks the client away from the current static multicast channel and then restarts it at another point within the video stream. Hence a simple method to support interactive control is to treat them just like a new request. Generally, this approach will increase loads at the dynamic multicast channels and result in increased waiting time for both new session and interactive control requests. As there is no generally accepted user-activity model, we do not attempt to quantify the performance impact of this approach in this study.

In the following sections, we present methodology that take advantage of the staggered static multicast schedule to support pause-resume, slow motion, and seeking in SS-VoD in a resource-free way. In other words, no additional server resource or client buffer is needed to support these interactive controls in SS-VoD.

IV.A. Pause-Resume

We use a simple channel-hopping algorithm to implement pause-resume in SS-VoD. Specifically, since a client has a buffer large enough to cache $T_R$ seconds of video, it can just continue buffering incoming video data after the user paused playback. If the user resumes playback before the buffer is full, then no further action is required. By contrast, if the buffer becomes full, then the client simply stops receiving data and enters an idle state.

When the user resumes playback, the client can resume playback immediately and at the same time determine the nearest multicast channel that is currently multicasting the video. Since a movie is repeated every $T_R$ seconds and the client buffer already contains $T_R$ seconds' worth of video data, we can guaranteed that the client can locate and merge back to an existing static multicast channel. Preferably, the pause-resume is implemented as discussed above on a system in which a client that begins using any pre-scheduled multicast of a video does not have to change channels to receive the remainder of that video. This type of multicast helps guarantee that the pause-resume can work without additional server resources. Thus, pause-resume is guaranteed and is supported without the need for any additional resource from the server (e.g., any service node 120a).

IV.B. Slow Motion

Slow motion is playback at a rate lower than the normal playback rate. As video data are always being transmitted and received at the normal video bit-rate, once slow motion is started data will begin to accumulate in the client buffer. Now if the user resume normal speed playback before the buffer is full, then no additional action needs to be done.

However, if playback continues in slow motion state for sufficiently long duration, the client buffer will eventually be fully filled up with video data. Note that at the instant when the buffer becomes full, the buffer will contain $T_R$ seconds' worth of video data. This is equivalent to the buffer full state in performing a pause operation. The only difference is that in performing pause, the client will stop receiving data until the user resumes playback, at which time a nearby (in time) multicast channel will be located to merge back into. For slow motion, however, playback continues at that instant and hence it is necessary to immediately locate a nearby multicast channel other than the current one to merge back into. As any play point is at most $T_R$ seconds away due to the staggered static multicast schedule, the $T_R$ seconds' worth of data in the buffer guarantees that the client can locate and merge back into a static multicast channel. If slow motion continues after merging, then data will begin to accumulate in the buffer again and the cycle repeats until normal playback speed is resumed.

Using this algorithm, slow motion at any rate slower than the normal playback rate can be supported without the need for any additional resource from the server. Client buffer requirement also remains the same.

IV.C. Seeking

Seeking is the change from one playback point to another. Typically, the user initiates seeking either by giving a new destination time offset or by means of using a graphical user interface such as a slider or a scroll bar. SS-VoD can support different types of seeking depending on the seek direction, seek distance, and the state of the client buffer and static multicast channels. Specifically, due to patching, the client buffer typically has some advance data cached. Moreover, some past video data will also remain in the client buffer until being overwritten with new data. Hence, if the new seek position is within the range of video data in the client buffer, seeking can be implemented simply by changing the playback point internally.

Now if the seek position, denoted by $t_s$, lies outside the client buffer, then the client may need to switch multicast channels to accomplish the seek. Let $t_i$, $i=0, 1, \ldots, N_S-1$ be the current playback points of the $N_S$ static multicast channels and assume the client is currently on channel x. Then the client will choose the nearest channel to restart playback by finding the channel j such than the seek error $\epsilon=\min \{|t_j-t_s|, |t_s-t_j|\}$ is minimized. Note that the current channel may happen to be the nearest channel and in this case, the client simply seeks to the oldest data in the buffer if $t_s$ is earlier than the current playback point; or seeks to the newest data in the buffer otherwise.

In the previous case the seek operation may not end up in the precise location specified by the user and the seek error can be up to $T_R/2$ seconds. In return, this seeking algorithm can be supported without incurring server overhead or additional client buffer. If more precise seeking is needed, then a dynamic multicast channel is used to merge the client back to an existing static multicast channel.

V. Performance Modeling

In this section we present an approximate performance model for the SS-VoD architecture. While exact analytical solution does not appear to be tractable, we were able to derive an approximate model that can be solved numerically. The purpose of this performance model is to assist system designers to quickly evaluate various design options and to perform preliminary system dimensioning. Once the approximate system parameters are known, one can resort to a more detailed simulation to obtain more accurate performance results.

The primary performance metric we use in this study is startup latency, defined as the time a client submitted a request to the admission controller to the time the beginning of the requested video starts streaming. For simplicity, we assume there is a single video title stored in a service node and ignore network delay, transmission loss, and processing time at the admission controller.

In the following sections, we will first derive the average waiting time for statically-admitted clients and dynamically-admitted clients, and then investigate the configuration of the admission threshold and the channel partitioning policy.

V.A. Waiting Time for Statically-Admitted Clients

As has been described above, there are two ways to admit a client into the system. The first way is admission through a static multicast channel as shown in FIG. 4A. Given that any clients arriving within the time window of 2δ seconds will be admitted this way, it is easy to see that the average waiting time for statically-admitted clients, denoted by $W_S(\delta)$, is equal to half of the admission threshold:

$$W_S(\delta)=(\delta) \quad \text{(eq2)}$$

assuming it is equally probable for a request to arrive at any time within the time window.

V.B. Waiting Time for Dynamically-Admitted Clients

The second way to admit a new client is through a dynamic multicast channel as shown in FIG. 4B or 4C. Unlike static multicast channels, dynamic multicast channels are allocated in an on-demand basis according to the admission procedure described above. Specifically, if there are one or more free channels available at the time a request arrives (and assuming Wmin is set to zero), a free channel will be allocated to start transmitting video data to the client immediately and the resultant waiting time will be zero.

On the other hand, if there is no channel available at the time a request arrives, then the resultant waiting time will depend on when a request arrive and when a free dynamic multicast channel becomes available. Specifically, requests arriving at the admission controller will be consolidated using the procedure described above where the admission controller will send a consolidated START request to a service node to initiate video transmission.

FIG. 8 illustrated this admission process. This example assumes that there is no request waiting and all dynamic multicast channels are occupied before the first client request arrives at time $T_{A1}$. After receiving the first request, the admission controller sends a START request to a service node to initiate a new multicast transmission for this request. However as all channels are occupied, the transmission will not start until a later time $T_D$ when a free channel becomes available. During this waiting time, additional client requests arrive but the admission controller will not send additional START request to the service node, as discussed above. This process repeats when a new request arrives at time $T_{A2}$.

Based on this model, we first derive the average waiting time experienced by a START request at the service node. For the arrival process, we assume that user requests form a Poisson arrival process with rate $\lambda$. The proportion of client requests falling within the admission threshold is given by $$P_S = \frac{2\delta}{T_R} \tag{eq 3}$$

and these clients will be statically-admitted.

Correspondingly, the proportion of dynamically-admitted clients is equal to $(1-P_S)$. We assume that the resultant arrival process at the admission controller is also Poisson, with a rate equal to $$\lambda_D = (1-P_S)\lambda \tag{eq 4}$$

Referring to FIG. 8, we observe that the time between two adjacent START requests is composed of two parts. The first part is the waiting time for a free dynamic multicast channel; and the second part is the inter-arrival time $(T_{A1}'-T_D)$ for dynamically admitted client requests. Let $W_C(\delta)$ be the average waiting time for a free dynamic multicast channel given $\delta$. Then the inter-arrival time for START requests will be given by $$\frac{1}{\lambda_S} = W_C(\delta) + \frac{1}{\lambda_D} \tag{eq 5}$$

where $\lambda_S$ is the arrival rate for START requests. For simplicity, we assume that the arrival process formed from START requests is also a Poisson process.

For the service time of START request, it depends on the last user joining the batch (see FIG. 4C). In particular, the service time of the last user equals to the arrival time $T_{An}$ minus the time $T_{S1}$ for the previous multicast of the requested video title. The service time, denoted by s, can range from 0 to $(T_R-2\delta)$. We assume the service time s is uniformly distributed between $$0 < s < T_R - 2\delta \tag{eq 6}$$

Therefore the dynamic multicast channels form a multi-server queueing system with Poisson arrival and uniformly-distributed service time. As no close-form solution exists for such queueing model, we resort to the approximation by Allen and Cunneen for G/G/m queues (see A. O. Allen, *Probability, Statistics, and Queueing Theory with Computer Science Applications*, 2nd Ed. Academic Press, New York, 1990) to obtain the average waiting time for a dynamic multicast channel:

$$W_C(\delta) = \frac{E_C(N_D, u)}{N_D(1-\rho)} \left( \frac{C_A^2 + C_S^2}{2} \right) T_S \tag{eq 7}$$

where $C_A^2=1$ is the coefficient of variation of Poisson process, $$C_S^2 = \frac{(T_R - 2\delta)^2}{12} \left( \frac{2}{T_R - 2\delta} \right)^2 = \frac{1}{3} \tag{eq 8}$$

is the coefficient of variation for uniformly-distributed service time, and TS is the average service time, given by $$T_S = \frac{T_R - 2\delta}{2} \tag{eq 9}$$

Additionally, $u=\lambda_S T_S$ is the traffic intensity, $\rho=u/N_D$ is the server utilization, and $E_C(N_D,u)$ is the Erlang-C function:

$$E_C(N_D, u) = \frac{u^{N_D}/N_D!}{u^{N_D}/N_D! + (1-\rho)\sum_{k=0}^{N_D-1} \frac{u^k}{k!}} \tag{eq 10}$$

Since the traffic intensity depends on the average waiting time, and the traffic intensity is needed to compute the average waiting time, Equation (eq7) is in fact recursively defined. Due to (eq10), Equation (eq7) does not appear to be analytically solvable. Therefore, we can apply numerical methods to solve for $W_C(\delta)$ to compute numerical results.

Now that we have obtained the waiting time for a START request, we can proceed to compute the average waiting time for dynamically-admitted client requests. Specifically, we assume the waiting time for a START request is exponentially distributed with mean $W_C(\delta)$. We classify client requests into two types. A Type-1 request is the first request that arrives at the beginning of the admission cycle. Type-2 requests are the other requests that arrive after a Type-1 request. For example, in FIG. 8, the first request, of time $T_{A1}$, is a Type-1 request, and the next, say, two shown requests are Type-2 requests.

We first derive the average waiting time for Type-2 requests. Let $W_2(\delta)$ be the average waiting time for Type-2 requests which can be shown to be:

$$W_2(\delta) = W_C(\delta)\left(1 - \left[\frac{1 + (T_R - 2\delta)/2W_C(\delta)}{1 - e^{\frac{-(T_R-2\delta)}{W_C(\delta)}}}\right]\frac{(T_R - 2\delta)}{W_C(\delta)} e^{\frac{-(T_R-2\delta)}{W_C(\delta)}}\right) \quad \text{(eq 11)}$$

Next for Type-1 requests, the average waiting time, denoted by $W_1(\delta)$, is simply equal to $W_C(\delta)$. Therefore the overall average waiting time, denoted by $W_D(\delta)$, can be computed from a weighted average of Type-1 and Type-2 requests:

$$W_D(\delta) = \frac{W_1(\delta) + M_2(\delta)W_2(\delta)}{1 + M_2(\delta)} \quad \text{(eq 12)}$$

$$= \frac{W_1(\delta) + W_C(\delta)\lambda_D W_2(\delta)}{1 + W_C(\delta)\lambda_D}$$

where $M_2(\delta)$ is the expected number of Type-2 requests in an admission cycle and can be computed from $$M_2(\delta) = W_C(\delta)\lambda_D \quad \text{(eq13)}$$

Thus, an embodiment of the present invention is a computer, running software, that takes as input the parameters of a proposed VoD system (e.g., including the number of channels, number of videos, allocation of channels, admission threshold, and the like,) and an expected arrival rate or several such arrival rates and quickly determines and outputs an estimate of the expected start-up latency faced by users of the system. Such a system modeler is useful and unique because it starts with the size of the network and quickly tells what the expected latency will be, and thus system builders can dimension their system. The system modeler implement uses the equations discussed above for the SS-VoD architecture.

In contrast, conventional VoD architectures that are reasonably powerful are typically modeled using an assumption that the network in question can always allocate enough bandwidth (i.e., won't run out of channels) to execute the operations required by the architecture. The result is that conventional models are inadequate and require extremely tedious numerical simulation to produce useful information for system builders.

V.C. Admission Threshold

In the previous derivations, we have assumed that the admission threshold value is given a priori. Consequently, the resultant average waiting time for statically-admitted and dynamically-admitted users may differ. To maintain a uniform average waiting time for both cases, we can adjust the admission threshold such that the average waiting time difference is within a small error $\epsilon$:

$$\delta = \min\{x | (W_S(x) - W_D(x)) \leq \epsilon, T_R \geq x \geq 0\} \quad \text{(eq14)}$$

As adjusting the admission threshold does not affect existing users, the adjustment can be done dynamically while the system is online. In particular, the system can maintain a moving average of previous users' waiting time as the reference for threshold adjustment. This enables the system to maintain a uniform average waiting time for both statically-admitted and dynamically-admitted users. The term latency in this paper refers to this uniform average waiting time.

V.D. Channel Partitioning

An important configuration parameter in SS-VoD is the partitioning of available channels for use as dynamic and static multicast channels. Intuitively, having too many dynamic multicast channels will increase the traffic intensity at the dynamic multicast channels due to increases in the service time (c.f. Equations (eq1) and (eq9)). On the other hand, having too few dynamic multicast channels may also result in higher load at the dynamic multicast channels. We can find the optimal channel partitioning policy by enumerating all possibilities, which in this case is of O(N). If the patching transmission is restricted to being a unicast (as shown in FIG. 4B), then the optimal channel partition policy is arrival-rate dependent. However, we found that, if the patching transmission is a multicast (see FIG. 4C), then the optimal channel partitioning policy is relatively independent of the user arrival rate in SS-VoD.

VI. Performance Evaluation

In this section, we present simulation results to evaluate performance of the SS-VoD architecture. We first validate the analytical performance model using simulation results and then proceed to investigate the effect of the channel partitioning policy, to compare latency and channel requirement between TVoD, NVoD, UVoD, with SS-VoD, and finally investigate the performance of SS-VoD under extremely light loads. Note that UVoD refers to Unified VoD, which is essentially SS-VoD in which the dynamically scheduled patching transmission are restricted to using only unicasts (as shown in FIG. 4B) and the service nodes serve as their own admission controllers to handle all clients instead of having an intermediate layer of admission controllers (as in FIG. 5) and their more complex hierarchical admission procedure (as in FIGS. 6 and 7).

VI.A. Model Validation

To verify accuracy of the performance model derived in Section V, we developed a simulation program using CNCL (ComNets Class Library and Tools: http://www.comnets.r-wth-aachen.de/doc/cncl.html) to obtain simulation results for comparison. A set of simulations is run to obtain the latency over a range of arrival rates. Each run simulated a duration of 1440 hours (60 days), with the first 24 hours of data skipped to reduce initial condition effects. There is one movie in the system, with a length of 120 minutes. We divide available multicast channels equally into static-multicast and dynamic-multicast channels. We do not simulate user interactions and assume all users playback the entire movie from start to finish.

Figure 9A:
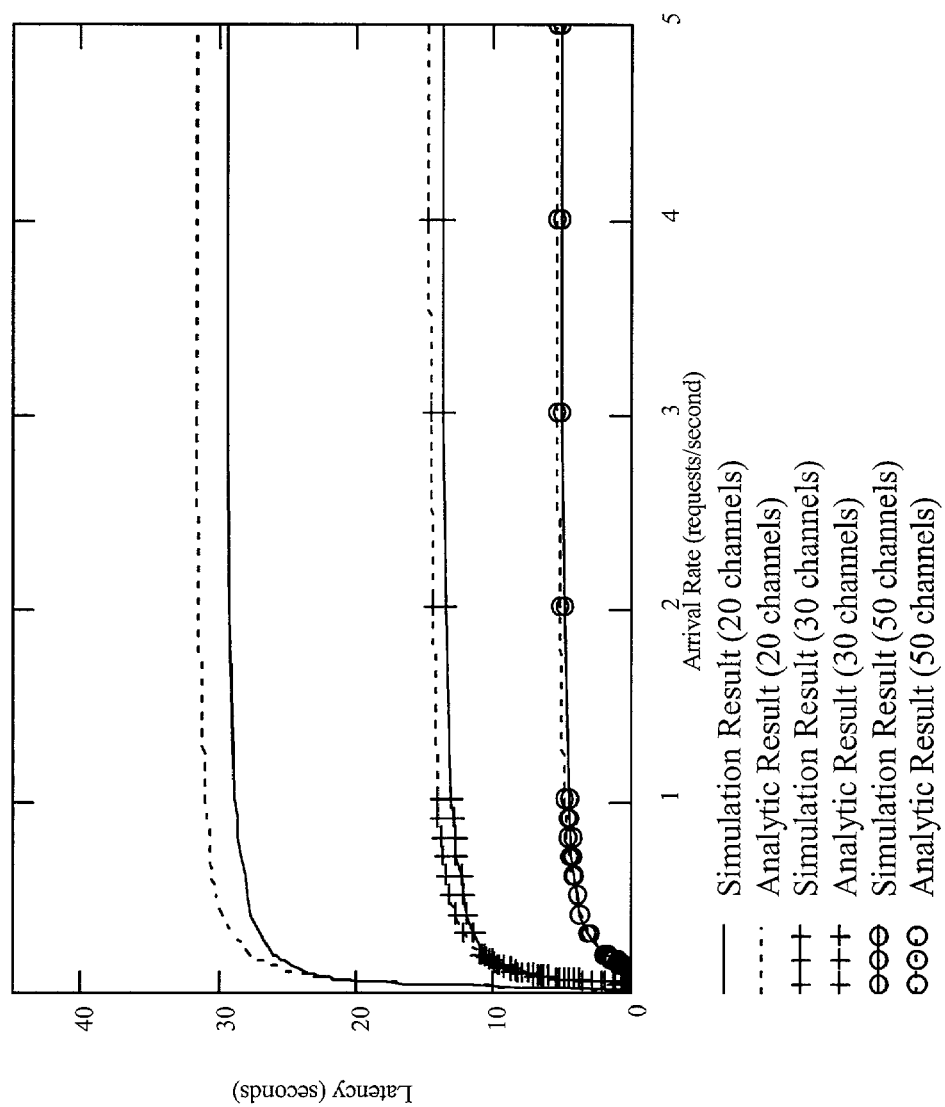
FIG. 9A shows latency versus arrival rate from analysis and simulation.

FIG. 9A shows the latency versus arrival rate ranging from $1 \times 10^{-3}$ to 5.0 requests per second. We observe that the analytical results are reasonable approximations for the simulation results. At high arrival rates (e.g. over 1 request per second), the analytical results over-estimate the latency by up to 5%. As discussed in the beginning of Section V, the analytical model is primary used for preliminary system dimensioning. Detailed simulation, while lengthy (e.g. hours), is still preferred to obtain more accurate performance results.

VI.B. Channel Partitioning

Figure 9B:
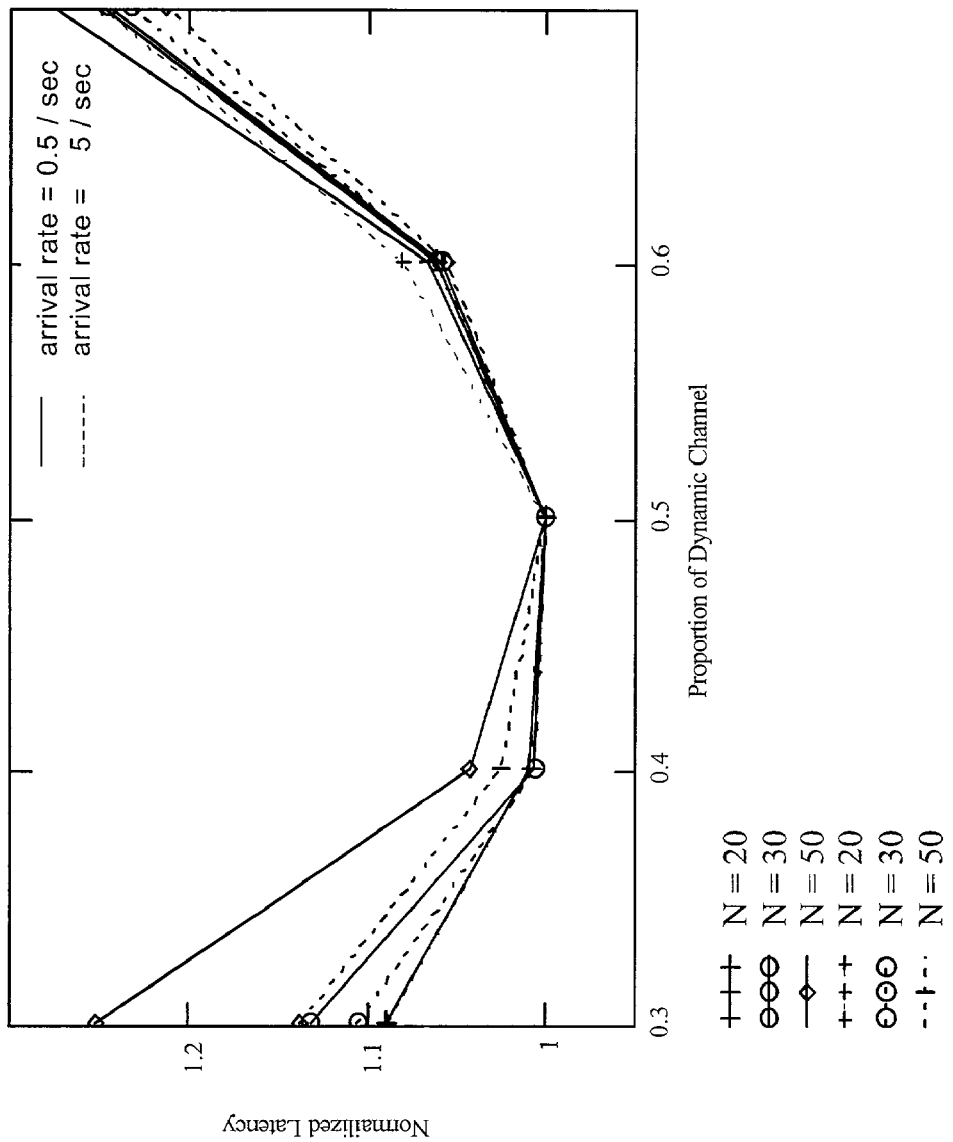
FIG. 9B shows the effect of channel partitioning on latency.

To investigate the performance impact of different channel allocations, we conducted simulations with the proportion of dynamic multicast channels, denoted by r, ranging from 0.3 to 0.7. The results are plotted in FIG. 9B. Note that we use a normalized latency instead of actual latency for the y-axis to facilitate comparison. Normalized latency is defined as $$\frac{w(r)}{\min\{w(r), \forall r\}} \quad \text{(eq 15)}$$

where w(r) is the latency with r×N dynamic multicast channels.

Figure 9C:
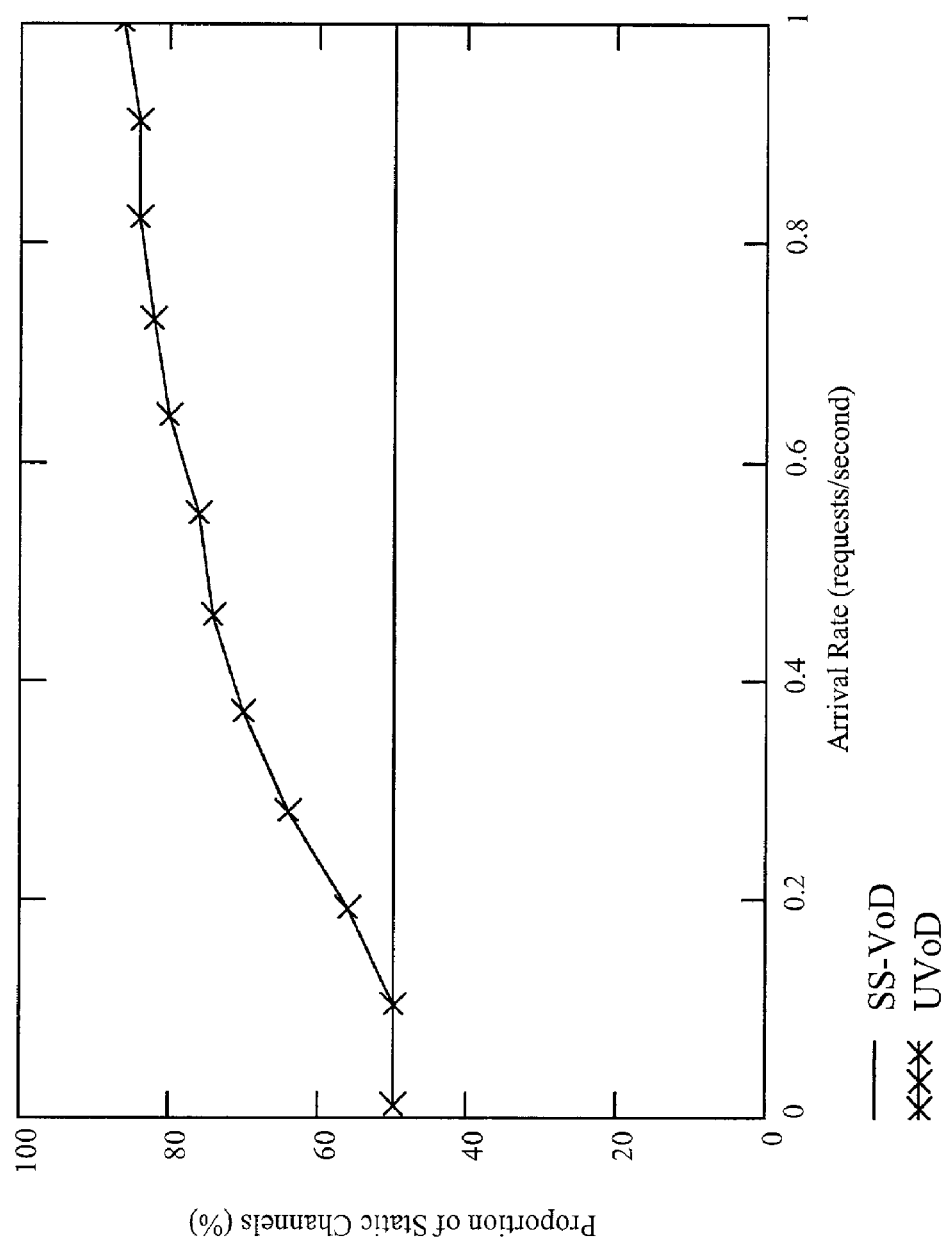
FIG. 9C shows comparison of optimal channel allocation in two embodiments of the present invention.

We simulated three sets of parameters with N=20, 30, and 50 for two arrival rates, namely heavy load at 5 requests/second and light load at 0.5 requests/second. Surprisingly, the results show that in all cases the latency is minimized by assigning half of the channels to dynamic multicast and the other half to static multicast. For comparison, UVoD exhibits a different behavior and requires more channels allocated for static multicast to minimize latency at high loads as shown in FIG. 9C for a 50-channel configuration.

This remarkable property of SS-VoD greatly simplifies system deployment as one will not need to reconfigure the system with a different channel partition policy in case the user demand changes.

VI.C. Latency Comparisons

Figure 9D:
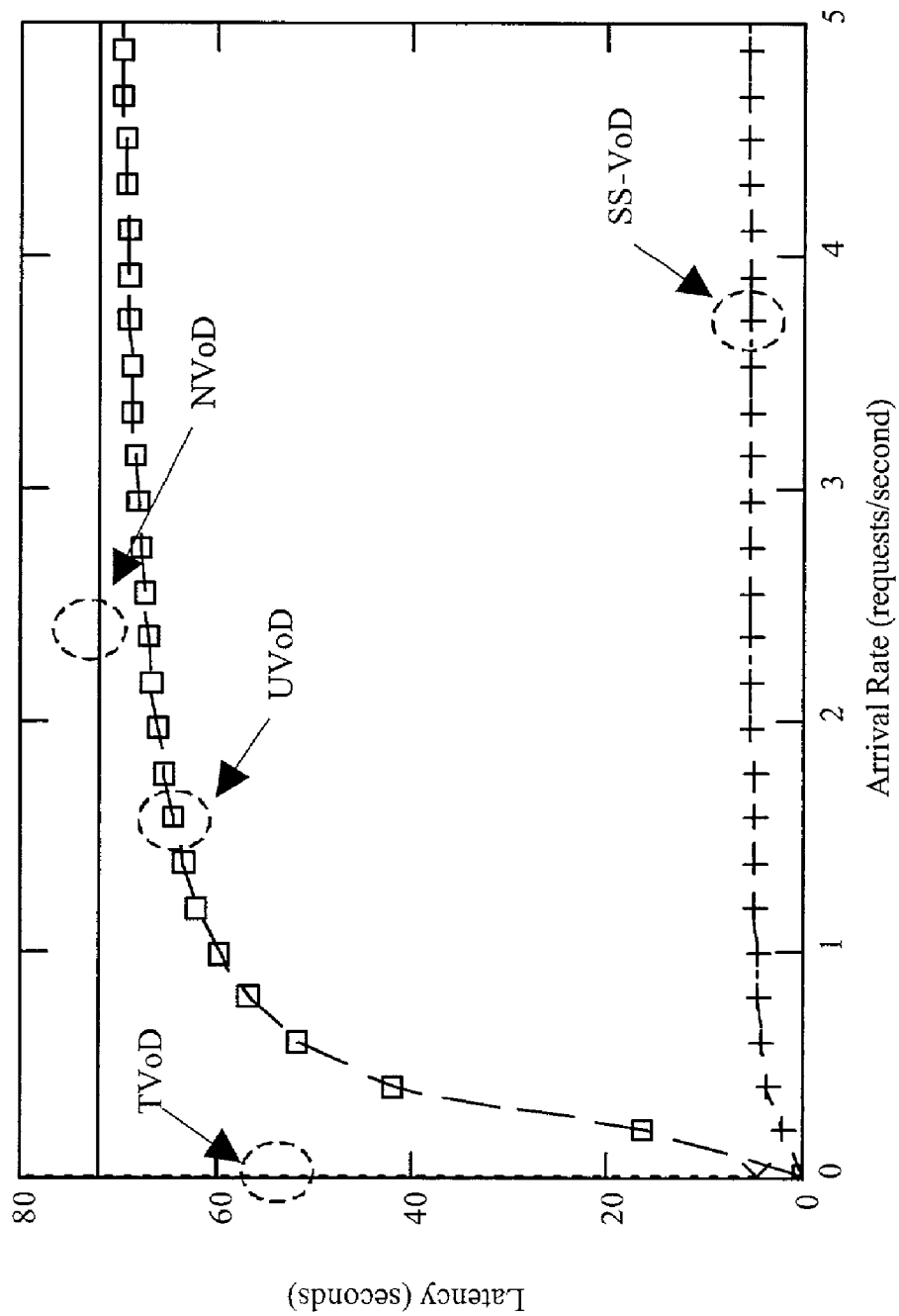
FIG. 9D shows comparison of latency for different arrival rates.

FIG. 9D plots the latency for SS-VoD, UVoD, TVoD, and NVoD for arrival rates up to 5 requests per second. The service node (or video server for TVoD/NVoD) has 50 channels and serves a single movie of length 120 minutes. The first observation is that except for NVoD, which has a constant latency of 72 seconds, the latency generally increases with higher arrival rates as expected. For TVoD, the server overloads for arrival rates larger than $1.16 \times 10^{-4}$ requests per second. UVoD performs significantly better with the latency asymptotically approaches that of NVoD. SS-VoD performs even better than UVoD, and the latency levels off and approaches 5.6 seconds, or a 92% reduction compared to UVoD.

It is also worth noting that the performance gain of SS-VoD over UVoD does not incur any tradeoff at the client side. Specifically, the buffer requirement and bandwidth requirement are the same for both SS-VoD and UVoD. The only differences are the replacement of the dynamic unicast channels in UVoD with dynamic multicast channels in SS-VoD, and the addition of the more complex admission procedure in the admission controller.

VI.D. Channel Requirement

Figure 9E:
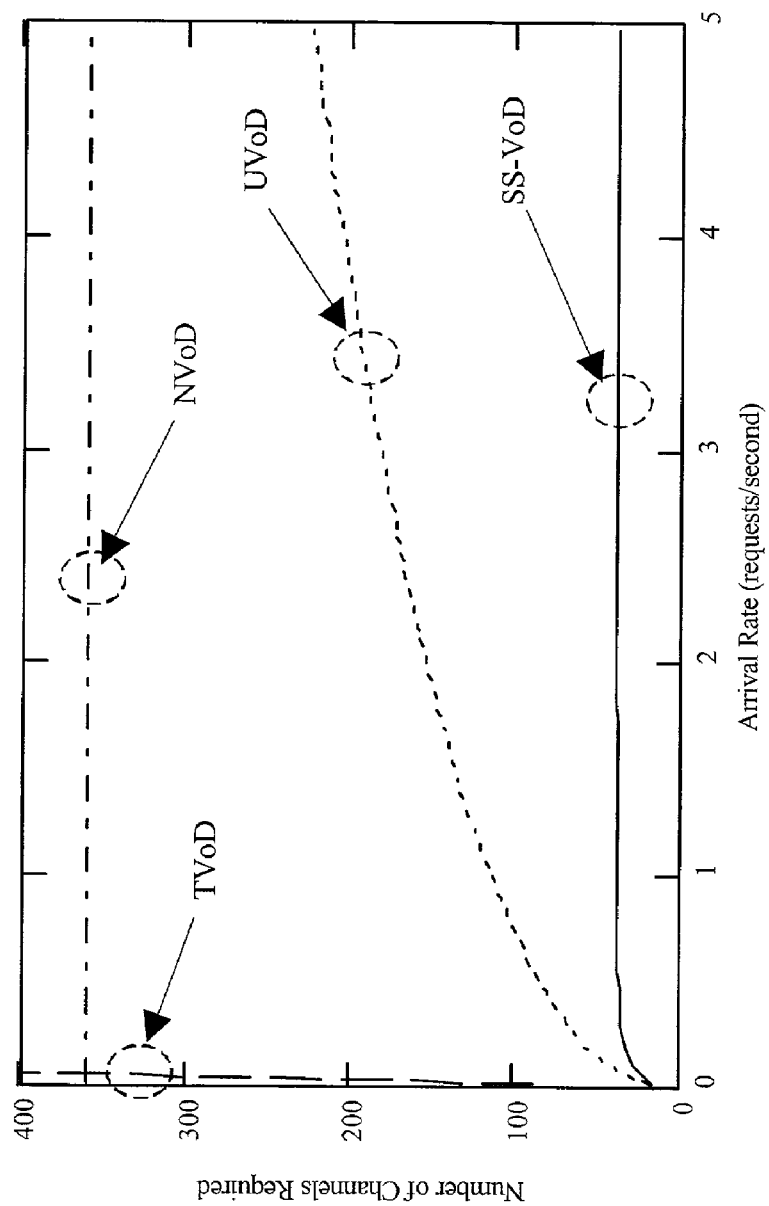
FIG. 9E shows comparison of channel requirements for different arrival rates.

Channel requirement is defined as the minimum number of channels needed to satisfy a given latency constraint at a certain arrival rate. FIG. 9E plots the channel requirements of SS-VoD, UVoD, TVoD, and NVoD versus arrival rates from 0.01 to 5 requests per second. The latency constraint is set to 10 seconds.

The number of channels required for NVoD is a constant value and equal to 360. The channel requirement of TVoD increases with the arrival rate and quickly exceeds that of NVoD. The channel requirements of SS-VoD and UVoD are significantly lower than both TVoD and NVoD. For higher arrival rates, SS-VoD outperforms UVoD by a wide margin. For example, the channel requirements at one request per second are 114 and 36 for UVoD and SS-VoD respectively; and the channel requirements at five requests per second are 225 and 38 for UVoD and SS-VoD respectively. This result demonstrates the performance gain achieved by replacing the dynamic unicast channels in UVoD with dynamic multicast channels in SS-VoD.

VI.E. Performance at Light Loads

The previous results are computed using relatively high arrival rates. Intuitively, the performance gains will decrease at lower arrival rates as fewer requests will be served by a dynamic multicast channel. To investigate this issue, we define a percentage of channel reduction over TVoD, denoted by G, as $$G = \frac{\min\{n \mid W_{TVoD}(n) \leq 1, \forall n = 0, 1, \ldots\} - \min\{n \mid W(n) \leq 1, \forall n = 0, 1, \ldots\}}{\min\{n \mid W_{TVoD}(n) \leq 1, \forall n = 0, 1, \ldots\}} \times 100\% \quad \text{(eq 6)}$$

where $W_{TVoD}(N)$ and W(n) are the latency given there are n channels, for TVoD and SS-VoD/UVoD respectively.

Figure 9F:
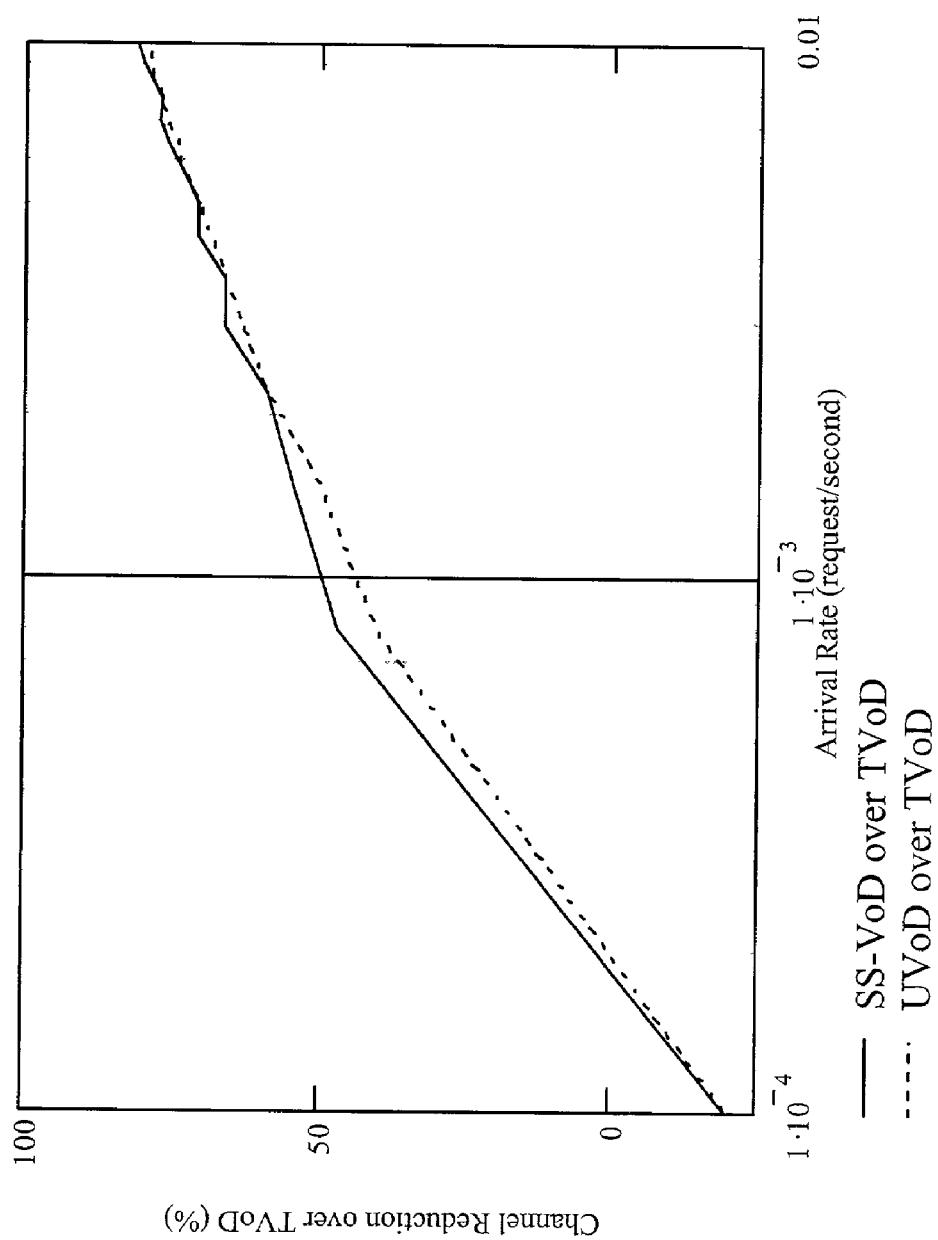
FIG. 9F shows comparison of channel reduction, over TVoD at very low arrival rates, for two embodiments of the present invention.

FIG. 9F plots the channel reduction for arrival rates from $1 \times 10^{-4}$ to 0.01 for SS-VoD and UVoD. The results show that SS-VoD requires fewer channels than TVoD as long as arrival rates are over $1.8 \times 10^{-4}$ requests per second. Note that at this low arrival rate, both TVoD and SS-VoD require only six channels. This suggests that SS-VoD is likely to outperform TVoD in practice.

VII. Implementation and Benchmarking

We implemented a SS-VoD prototype using off-the-shelf software and hardware. There are three components in the prototype: service node, admission controller, and video clients. Both the service node and the admission controller are implemented using the C++ programming language running on Red Hat Linux 6.2. Two client applications have been developed, one is implemented using the Java programming language and the Java Media Framework (JMF) 2.1 while the other is implemented using C++ on the Microsoft Windows platform. Both the service node and the admission controller are video format independent. The Java-version client supports MPEG1 streams, while the Windows-version client supports MPEG1, MPEG2, as well as basic MPEG4 streams. We also implemented the interactive playback controls presented in Section IV, namely pause-resume, slow motion, and seeking.

With the SS-VoD prototype, we conducted extensive experiments to obtain measured benchmark results to verify against the analytical and simulation results. We developed a traffic generator in order to simulate a large number of client requests. The service node runs on a Compaq Proliant DL360 serving one movie of length 120 minutes with 30 channels, each at 1.5 Mbps. The clients are ordinary PCs and all machines are connected using a layer-3 IP switch with hardware IP multicast support. We measured the startup latency for arrival rates ranging from 1 to 5 requests per second. Each benchmark test runs for a total of six hours.

Throughout the description and drawings, example embodiments are given with reference to specific configurations. One of ordinary skill in the art would appreciate that other embodiments and configurations are possible. Such other configurations are all within the scope of this invention, since with the knowledge provided by the description and drawings one of ordinary skill in the art would be able to implement the other embodiments and configurations without undue experimentation.

The invention claimed is:

1. A method for providing sequential data blocks each having a duration, comprising:
  providing repeating pre-scheduled multicasts of a data block;
  dynamically initiating a transmission of the front portion of the data block in response to a user request to receive the data block from a user so as to serve the user outside the pre-scheduled multicasts of the data block as a dynamically admitted user;

merging the dynamically admitted user into one of the pre-scheduled multicasts of the data block;

wherein the dynamically initiated transmission is a multicast transmission that is sent to and is shared by a plurality of dynamically admitted users for the data block who are admitted in time to catch the beginning of the dynamically initiated multicast transmission.

2. The method according to claim 1, wherein each data block is a video comprising images viewed sequentially over time, whereby the video has a sequence and a duration, whereby the data block is a sequential data block having duration.

3. The method according to claim 1, wherein a length of the front portion of the data block is variable according to a greatest duration of the portion of the video that is needed by the dynamically admitted users.

4. A method for providing videos to users, the method comprising:

multicasting a video according to a predetermined schedule, the multicasting hereinafter referred to as the first multicasting;

receiving an indication that a user desires to see the video;

in response to user requests from a plurality of users for the video outside the predetermined schedule for the first multicasting, dynamically initiating a multicast transmission of the video to at least a portion of the plurality of users whose requests are made in time to catch the beginning of the dynamically initiated multicast transmission;

if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and if the first multicasting will multicast the video timely for the user to receive and view the video with acceptably low waiting time, then causing the user to receive the first multicasting without needing to receive the dynamically initiated transmission.

5. The method according to claim 4, wherein the first multicasting is such that once the user begins receiving any portion of the video via the first multicasting, then the user does not need to change channel to receive substantially the entire remainder of the video.

6. The method according to claim 4, wherein the predetermined schedule is established more than about six hours before the first multicasting.

7. The method according to claim 4, wherein the predetermined schedule includes multiple fixed start times for the video, wherein multicastings according to the multiple fixed start times overlap in time.

8. The method according to claim 4, wherein the dynamically initiating transmission of the first portion of the video comprises dynamically initiating multicasting of the first portion of the video, the dynamically initiated multicasting hereinafter referred to as the second multicasting.

9. The method according to claim 4, wherein the first multicasting is over one of a set of channels pre-assigned for multicasting the video according to the predetermined schedule, the set of channels hereinafter referred to as the first set of channels.

10. The method according to claim 9, wherein a second set of channels is pre-assigned for dynamically initiated transmission for the video.

11. The method according to claim 10, wherein the number of channels in the second set of channels is allocated to be at least about the number of channels in the first set of channels.

12. The method according to claim 4, wherein the video includes a front-most portion of the video, and the first portion includes the front-most
portion of the video.

13. The method according to claim 4, wherein the first multicasting and the dynamically initiated transmission are both served from a same server.

14. The method according to claim 4, further comprising: causing the second portion of the video to be received and buffered by the user while the user is receiving and viewing the at least some of the first portion of the video, and then causing the buffered second portion of the video, time shifted, to be transmitted to and viewed by the user to thereby provide seamless viewing of the at least some of the first portion of the video and the second portion of the video the user.

15. The method according to claim 14, further comprising: using video buffering and an existing multicasting according to the predetermined schedule to provide pausing and resuming functions to a user without incurring additional resource expenditure by any server or network element involved in the first multicast or the dynamically initiated transmission.

16. The method according to claim 14, further comprising using video buffering and an existing multicasting according to the predetermined schedule to play the video in slow motion at a request of a user without incurring additional resource expenditure by any server or network element involved in the first multicast or the dynamically initiated transmission.

17. The method according to claim 14, further comprising using video buffering and an existing multicasting according to the predetermined schedule to allow a user to seek to an approximate new point in the video at will without incurring additional resource expenditure by any server or network element involved in the first multicast or the dynamically initiated transmission, and initiating an additional dynamically initiated transmission to provide a user with a precise seek to a new point in the video.

18. The method according to claim 4, wherein a length of the first portion is variable according to a greatest duration of the portion of the video that is needed by the dynamically admitted users.

19. A method for providing videos to users, the method comprising:

multicasting a video according to an earlier determined schedule, the multicasting hereinafter referred to as the first multicasting;

receiving at least one request that is indicative that a user desires to see the video; and in response at least in part to the request, dynamically multicasting a portion of the video to the user and at least one additional user requesting for the video outside the predetermined schedule for the first multicasting in time to catch the beginning of the dynamically initiated multicasting;

wherein at least one user receives the portion of the video, hereinafter referred to as the first portion of the video, from the dynamically multicasting; the at least one user receives, from the first multicasting, at least a portion of the video, hereinafter referred to as the second portion of the video; and the at least one user plays the first portion of the video followed by the second portion or the video.

20. The method according to claim 19, wherein the first multicasting is such that once a user begins receiving the first multicasting, then further communication for channel establishment is not required between the user and any network element that delivers the video to receive substantially the entire remainder of the video.

21. The method according to claim 19, wherein start time for any given multicast in the earlier determined schedule are not in response to any arrival of a user who will receive the given multicast, whereby even if no user is expected to watch the given multicast, the given multicast still takes place at its earlier determined start time.

22. The method according to claim 19, wherein multiple prefix servers are not used in conjunction with the dynamically multicasting.

23. The method according to claim 19, wherein the first multicasting and the dynamically multicasting are both served from a same server.

24. The method according to claim 19, wherein a length of the first portion is variable according to a greatest duration of the portion of the video that is needed by the dynamically admitted users.

25. A method for providing videos to users, the method comprising:
  (a) receiving a request from a user to receive a video at a controller;
  (b) producing a statically scheduled multicast of the video to serve each user who requests for the video within a threshold time parameter prior to the beginning of the statically scheduled multicast of the video;
  (c) sending a request toward a server to begin dynamically scheduling a new multicast for the video in response to requests for the video from a plurality of users that are not within the threshold time parameter prior to the beginning of the statically scheduled multicast of the video; and
  (d) receiving a confirmation at the controller that the new multicast for the video has been dynamically scheduled, and, in response, arranging for the users to share and to receive the upcoming dynamically scheduled new multicast for the video, wherein the new multicast for the video includes less than the entire video;
  (e) causing the user whose request is not within the threshold time parameter to receive and buffer an in-progress pre-scheduled multicast of the video and to receive playback of the dynamically scheduled new multicast for the video; and
  causing the buffered portion of the pre-scheduled multicast of the video to be played for the user after the dynamically scheduled new multicast has caught up to the buffered portion of the video.

26. The method of claim 25, further comprising:
  (f) receiving a number of additional requests from additional users to receive the video at the controller in between execution of the steps (c) and (d); and
  (g) refraining from sending additional requests toward the server in response to the additional requests until, in the step (d), receiving the confirmation at the controller that the new multicast for the video has been dynamically scheduled, and then:
  (h) arranging for the additional users to receive the upcoming dynamically scheduled new multicast for the video; and
  (i) sending a request toward the server to increase the amount of the video to include in the new multicast for the video, to thereby accommodate the additional users.

27. A system for providing videos to users, the system comprising:
  means for multicasting a video according to a predetermined schedule, the multicasting hereinafter referred to as the first multicasting;
  means for receiving an indication that a user desires to see the video;
  means for, if the first multicasting will not multicast the video timely for the user to receive and view the video with acceptably low waiting time according to a threshold parameter, then dynamically initiating transmission of a portion of the video, the portion hereinafter referred to as the first portion of the video,
  wherein the user will receive at least some of the first portion of the video, and the user will receive another portion of the video, hereinafter referred to as the second portion of the video, via the first multicasting;
  means for multicasting the dynamically initiated transmission of the portion of the video to a plurality of users requesting for the video in time to catch the beginning of the dynamically initiated multicast; and
  means for, if the first multicasting will multicast the video timely for the user to receive and view the video with acceptably low waiting time according to the threshold parameter, then causing the user to receive the first multicasting without needing to receive the dynamically initiated transmission.

28. The system according to claim 27, wherein the means for multicasting is configured such that once the user begins receiving any portion of the video via the first multicasting, then the user does not need to change channel to receive substantially the entire remainder of the video.

29. The system according to claim 27, wherein the predetermined schedule includes multiple fixed start times for the video, wherein multicastings according to the multiple fixed start times overlap in time.

30. The system according to claim 27, wherein the dynamically initiating transmission of the first portion of the video comprises dynamically initiating multicasting of the first portion of the video, the dynamically initiated multicasting hereinafter referred to as the second multicasting.

31. The system according to claim 27, wherein the system further comprises means for determining a length of the first portion is variable according to a greatest duration of the portion of the video that is needed by the dynamically admitted users.

32. A system for providing videos to users, the system comprising:
  means for multicasting a video according to an earlier determined schedule, the multicasting hereinafter referred to as the first multicasting;
  means for receiving at least one request that is indicative that a user desires to see the video;
  means for, in response at least in part to the request, dynamically multicasting a portion of the video; and
  means for sharing the dynamically multicast portion of the video among a plurality of users requesting for the video in time to catch the beginning of the dynamically multicast portion of the video,
wherein at least one user receives the portion of the video, hereinafter referred to as the first portion of the video, from the dynamically multicasting; the at least one user receives, from the first multicasting, at least a portion of the video, hereinafter referred to as the second portion of the video; and the at least one user plays the first portion of the video followed by the second portion of the video.

33. The system according to claim 32, wherein the first multicasting is such that once a user begins receiving the first multicasting, then further communication for channel establishment is not required between the user and any network element that delivers the video to receive substantially the entire remainder of the video.

34. The system according to claim 32, wherein start time for any given multicast in the earlier determined schedule are not in response to any arrival of a user who will receive the given multicast, whereby even if no user is expected to watch the given multicast, the given multicast still takes place at its earlier determined start time.

35. The system according to claim 32, wherein the system further comprises means for determining a length of the first portion is variable according to a greatest duration of the portion of the video that is needed by the dynamically admitted users.

36. A system for providing videos to users, the system comprising:
means for receiving a request from a user to receive a video at a controller;
means for, if an upcoming statically scheduled multicast of the video will begin within a threshold time parameter, then arranging for the user to receive the upcoming statically scheduled multicast of the video, thereby satisfying the request from the user;
means for, otherwise, if no new multicast for the video is currently being dynamically scheduled, then sending a request toward a server to begin dynamically scheduling a new multicast for the video;
means for receiving a confirmation at the controller that the new multicast for the video has been dynamically scheduled, and, in response, arranging for the user to receive the upcoming dynamically scheduled new multicast for the video, wherein the new multicast for the video includes less than the entire video; and
means for sharing the dynamically scheduled new multicast for the video among a plurality of users requesting for the video in time to catch the beginning of the dynamically scheduled new multicast for the video,
wherein the user receives and buffers an in-progress pre-scheduled multicast of the video, the user receives and views the dynamically scheduled new multicast for the video, and the users begins to view content from the user's buffer from the in-progress pre-scheduled multicast after the dynamically scheduled new multicast has caught up to the content from the user's buffer.

37. The system of claim 36, further comprising:
means for receiving a number of additional requests from additional users to receive the video at the controller and refraining from sending additional requests toward the server in response to the additional requests until receiving the confirmation at the controller that the new multicast for the video has been dynamically scheduled; and
means for then arranging for the additional users to receive the upcoming dynamically scheduled new multicast for the video and sending a request toward the server to increase the amount of the video to include in the new multicast for the video, to thereby accommodate the additional users.

38. A system for providing video content, the system comprising:
at least one server, the at least one server configured to multicast a video via a network according to a fixed predetermined schedule and to dynamically initiate transmission of a portion of the video, hereinafter referred to as the first portion of the video, for at least one user, hereinafter referred to as the at least one dynamic user; and
a controller configured to receive requests from users to see a video and to indicate, to the at least one server, user interest to see the video, including interest by at least one of the at least one dynamic user, the controller operable to control the at least one server to serve a user via either the video multicast according to the fixed predetermined schedule or the dynamically initiated transmission;
wherein the at least one dynamic user receives at least part of the first portion of the video, and the at least one dynamic user also receives a portion of the video, hereinafter referred to as the second portion of the video, via the multicast according to the fixed predetermined schedule, and the first portion of the video includes video content not within the second portion of the video, and the at least one dynamic user is able to begin viewing the at least part of the first portion of the video and then to switch to viewing the second portion of the video, and
wherein the controller and the at least one server are further operable to, in response to user requests from a plurality of users for the video outside the video multicast according to the fixed predetermined schedule, direct the dynamically initiated transmission as a multicast to the plurality of users when the requests are made in time to catch the beginning of the dynamically initiated transmission multicast.

39. A video-on-demand system, comprising:
at least one server operable multicast a video to a network connected to users according to a fixed multicast schedule to deliver the video;
at least one prefix cache server in the network to store an initial prefix portion of each of available videos in the network including the video; and
a controller operable to control the at least one server and the one prefix cache server in delivering the video to the users,
wherein the controller is operable to serve the initial prefix portion of the video from the at least one prefix cache server to a user who requests for the video outside the fixed multicast schedule and to dynamically initiate transmission of at least a portion of the video to serve, at the end of the serving of the initial prefix portion of the video, the user who requests for the video outside the fixed multicast schedule, and
wherein the controller is further operable to use a buffered multicast of the video to serve the user who requests for the video outside the fixed multicast schedule and to stop serving the user from the dynamically initiated transmission.

40. The system as in claim 39, wherein the controller and the at least one server are further operable to, in response to requests from a plurality of users for the video outside the video multicast according to the fixed multicast schedule, direct the dynamically initiated transmission as a multicast to the plurality of users when the requests are made in time to catch the beginning of the dynamically initiated transmission multicast.

41. A method for providing videos to users, the method comprising:
multicasting a video according to a predetermined schedule, the multicasting hereinafter referred to as the first multicasting;
receiving an indication that a user desires to see the video;
if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and
if the first multicasting will multicast the video timely for the user to receive and view the video with acceptably low waiting time, then causing the user to receive the first multicasting without needing to receive the dynamically initiated transmission,
wherein acceptably low waiting time is according to an adjustable threshold parameter, the method further comprising adjusting the threshold parameter dynamically for subsequent users who desire to see the video, to thereby reduce usage of transmission resources at a cost of increasing expected waiting time, by reducing likelihood of dynamically initiating transmission for the subsequent users, or to thereby reduce expected waiting time at a cost of increasing usage of transmission resources, by increasing likelihood of dynamically initiating transmission for the subsequent users.

42. A method for providing videos to users, the method comprising:
multicasting a video according to a predetermined schedule, the multicasting hereinafter referred to as the first multicasting;
receiving an indication that a user desires to see the video;
if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and
if the first multicasting will multicast the video timely for the user to receive and view the video with acceptably low waiting time, then causing the user to receive the first multicasting without needing to receive the dynamically initiated transmission,
wherein acceptably low waiting time is according to an adjustable threshold parameter, further comprising automatically adjusting the threshold parameter dynamically to attempt to equalize an expected average waiting time for users who receive the dynamically initiated transmission for the video with an expected average waiting time for users who do not receive the dynamically initiated transmission for the video.

43. A method for providing videos to users, the method comprising:
multicasting a video according to a predetermined schedule, the multicasting hereinafter referred to as the first multicasting;
receiving an indication that a user desires to see the video;
if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and
if the first multicasting will multicast the video timely for the user to receive and view the video with acceptably low waiting time, then causing the user to receive the first multicasting without needing to receive the dynamically initiated transmission,
wherein acceptably low waiting time is according to an adjustable threshold parameter, and the threshold parameter may be adjusted along a continuum for graceful degradation of waiting-time performance as number of users increases.

44. A method for providing videos to users, the method comprising:
multicasting a video according to a predetermined schedule, the multicasting hereinafter referred to as the first multicasting;
receiving an indication that a user desires to see the video;
if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and
if the first multicasting will multicast the video timely for the user to receive and view the video with acceptably low waiting time, then causing the user to receive the first multicasting without needing to receive the dynamically initiated transmission,
wherein the dynamically initiated transmission includes a patching multicast for continuing a front-most portion of the video that was stored at one of multiple prefix storage sites.

45. A method for providing videos to users, the method comprising:
multicasting a video according to a predetermined schedule, the multicasting hereinafter referred to as the first multicasting;
receiving an indication that a user desires to see the video;
if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and
if the first multicasting will multicast the video timely for the user to receive and view the video with acceptably low waiting time, then causing the user to receive the first multicasting without needing to receive the dynamically initiated transmission, wherein the receiving step comprises receiving at a server, from one of multiple controllers, the indication that a user desires to see the video, wherein the one controller itself received multiple requests for multiple users to receive the video, but the one controller sent fewer indications to the server than the multiple received requests.

46. A method for providing videos to users, the method comprising:

multicasting a video according to a predetermined schedule, the multicasting hereinafter referred to as the first multicasting;

receiving an indication that a user desires to see the video, if the first multicasting will not multicast the video timely for the user to receive and view the video with acceptably low waiting time, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting;

if the first multicasting will multicast the video timely for the user to receive and view the video with acceptably low waiting time, then causing the user to receive the first multicasting without needing to receive the dynamically initiated transmission, accepting proposed system parameters including number of channels, number of videos, allocation of channels, and a threshold parameter that is indicative of an acceptably low waiting time;

accepting expected user arrival rates; and computing and outputting an approximate expected average wait time based on the proposed system parameters and the expected user arrival rates by using numeric solutions to a performance model;

wherein sufficiency of proposed system parameters can be approximately determined.

47. A method for providing videos to users, the method comprising:

multicasting a video according to an earlier determined schedule, the multicasting hereinafter referred to as the first multicasting;

receiving at least one request that is indicative that a user desires to see the video; and in response at least in part to the request, dynamically multicasting a portion of the video;

wherein at least one user receives the portion of the video, hereinafter referred to as the first portion of the video, from the dynamically multicasting; the at least one user receives, from the first multicasting, at least a portion of the video, hereinafter referred to as the second portion of the video; and the at least one user plays the first portion of the video followed by the second portion of the video, and wherein the dynamically multicasting is a patching multicasting used in connection with multiple prefix servers.

48. A system for providing videos to users, the system comprising:

means for multicasting a video according to a predetermined schedule, the multicasting hereinafter referred to as the first multicasting;

means for receiving an indication that a user desires to see the video;

means for, if the first multicasting will not multicast the video timely for the user to receive and view the video with acceptably low waiting time according to a threshold parameter, then dynamically initiating transmission of a portion of the video, the portion hereinafter referred to as the first portion of the video, wherein the user will receive at least some of the first portion of the video, and the user will receive another portion of the video, hereinafter referred to as the second portion of the video, via the first multicasting; and means for, if the first multicasting will multicast the video timely for the user to receive and view the video with acceptably low waiting time according to the threshold parameter, then causing the user to receive the first multicasting without needing to receive the dynamically initiated transmission, wherein:

the means for multicasting comprises a set of channels pre-assigned for multicasting the video according to the predetermined schedule;

the means for dynamically initiating transmission comprises a second set of channels preassigned for dynamically initiated transmission for the video; and the number of channels in the second set of channels is allocated to be about the number of channels in the first set of channels.

* * * * *